(12) United States Patent
Kwon et al.

(10) Patent No.: US 12,522,120 B2
(45) Date of Patent: Jan. 13, 2026

(54) IN-VEHICLE REFRIGERATOR

(71) Applicant: LG ELECTRONICS INC., Seoul (KR)

(72) Inventors: Boan Kwon, Seoul (KR); Daekee Shin, Seoul (KR); Sehdong Yoo, Seoul (KR); Young Hwan Lee, Seoul (KR); Je Kwang Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 18/559,614

(22) PCT Filed: Mar. 21, 2023

(86) PCT No.: PCT/KR2023/003699
§ 371 (c)(1),
(2) Date: Nov. 8, 2023

(87) PCT Pub. No.: WO2023/182758
PCT Pub. Date: Sep. 28, 2023

(65) Prior Publication Data
US 2024/0227652 A1     Jul. 11, 2024

(30) Foreign Application Priority Data
Mar. 21, 2022  (KR) .................. 10-2022-0035039

(51) Int. Cl.
*B60N 3/10* (2006.01)
*B60R 7/04* (2006.01)

(52) U.S. Cl.
CPC ............ *B60N 3/103* (2013.01); *B60N 3/104* (2013.01); *B60R 7/043* (2013.01)

(58) Field of Classification Search
CPC .......... B60N 3/103; B60N 3/104; B60R 7/043
(Continued)

(56) References Cited

U.S. PATENT DOCUMENTS 4,146,159 A * 3/1979 Hemmen ............... B60N 3/002
                                                                                 224/275
4,759,190 A * 7/1988 Trachtenberg ......... H10N 10/00
                                                                                    62/3.62

(Continued)

FOREIGN PATENT DOCUMENTS

EP        1431125 A1 * 6/2004 ............. B60R 11/02
JP        06-167157        6/1994
(Continued)

OTHER PUBLICATIONS

International Search Report dated Jul. 5, 2023 issued in Application No. PCT/KR2023/003699.

*Primary Examiner* — Nathan J Newhouse
*Assistant Examiner* — Lester L Vanterpool
(74) *Attorney, Agent, or Firm* — KED & ASSOCIATES, LLP

(57) ABSTRACT

Disclosed herein is a refrigerator for a vehicle. The refrigerator for a vehicle comprises: a refrigeration module having a refrigeration space therein, a seat mounting part sitting on a seat for a vehicle and having a docking part connecting to the refrigeration module, at an upper surface thereof, and a fixation belt part one side of which connects to the seat mounting part and the other side of which connects to a structure of the seat, to limit a movement of the seat mounting part.

20 Claims, 24 Drawing Sheets

(58) Field of Classification Search
USPC .......................................................... 224/275
See application file for complete search history.

(56) References Cited

U.S. PATENT DOCUMENTS

| | | | |
|---|---|---|---|
| 7,114,772 B2 | 10/2006 | Kobayashi et al. | |
| 10,112,550 B2 * | 10/2018 | Nickel | B60N 2/2824 |
| 11,440,478 B2 * | 9/2022 | Meador | B60R 7/043 |
| 2005/0225130 A1 | 10/2005 | Kobayashi et al. | |

FOREIGN PATENT DOCUMENTS

| | | | | |
|---|---|---|---|---|
| JP | 2006-082604 | | 3/2006 | |
| KR | 10-0845153 | | 7/2008 | |
| KR | 10-2012-0094382 | | 8/2012 | |
| KR | 20130071565 A | * | 7/2013 | ............... B60R 5/04 |
| KR | 10-2021-0155368 | | 12/2021 | |
| KR | 20210155368 A | * | 12/2021 | |
| KR | 10-2022-0131205 | | 9/2022 | |

* cited by examiner

[FIG. 1]
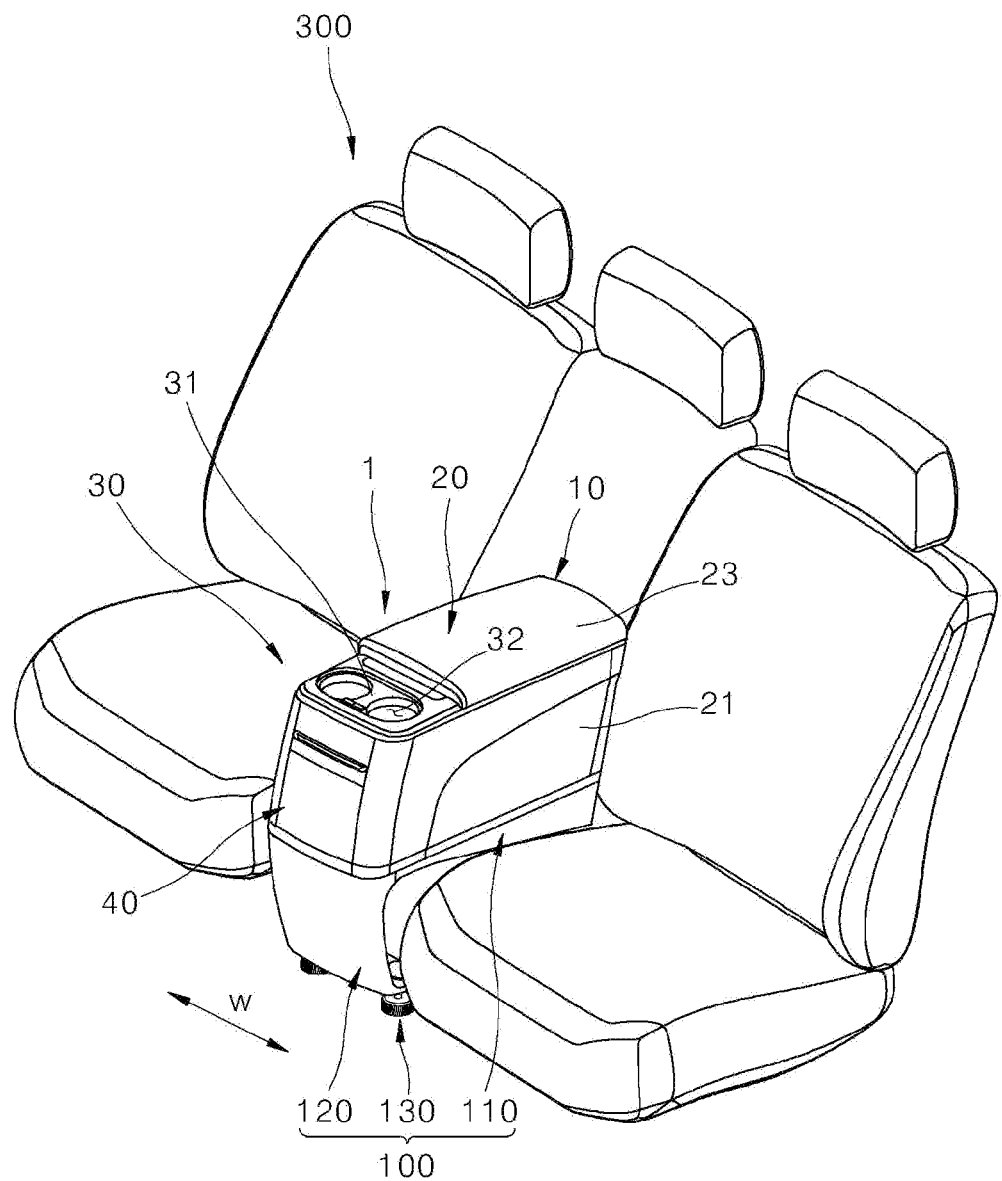

[FIG. 2]
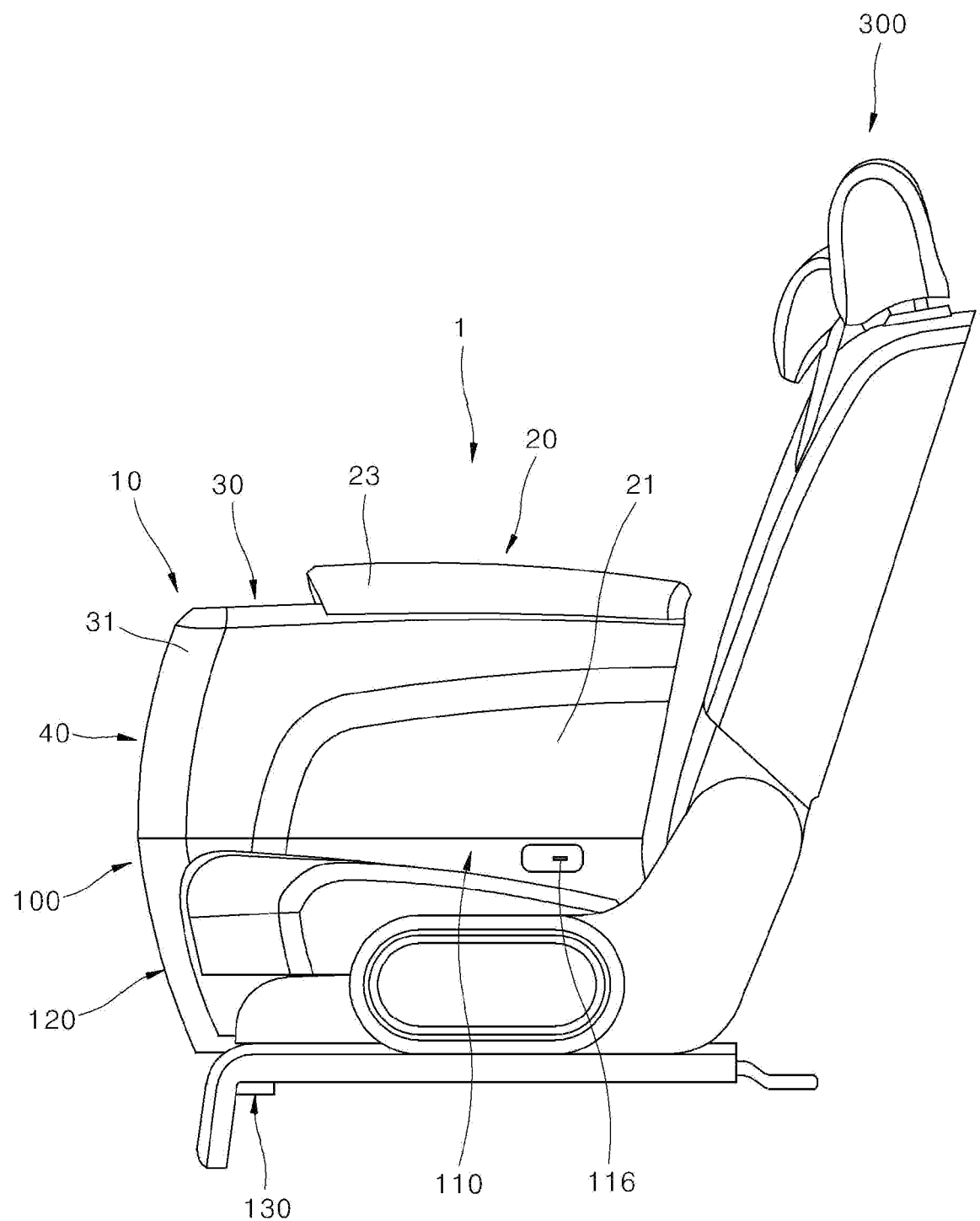

[FIG. 3]
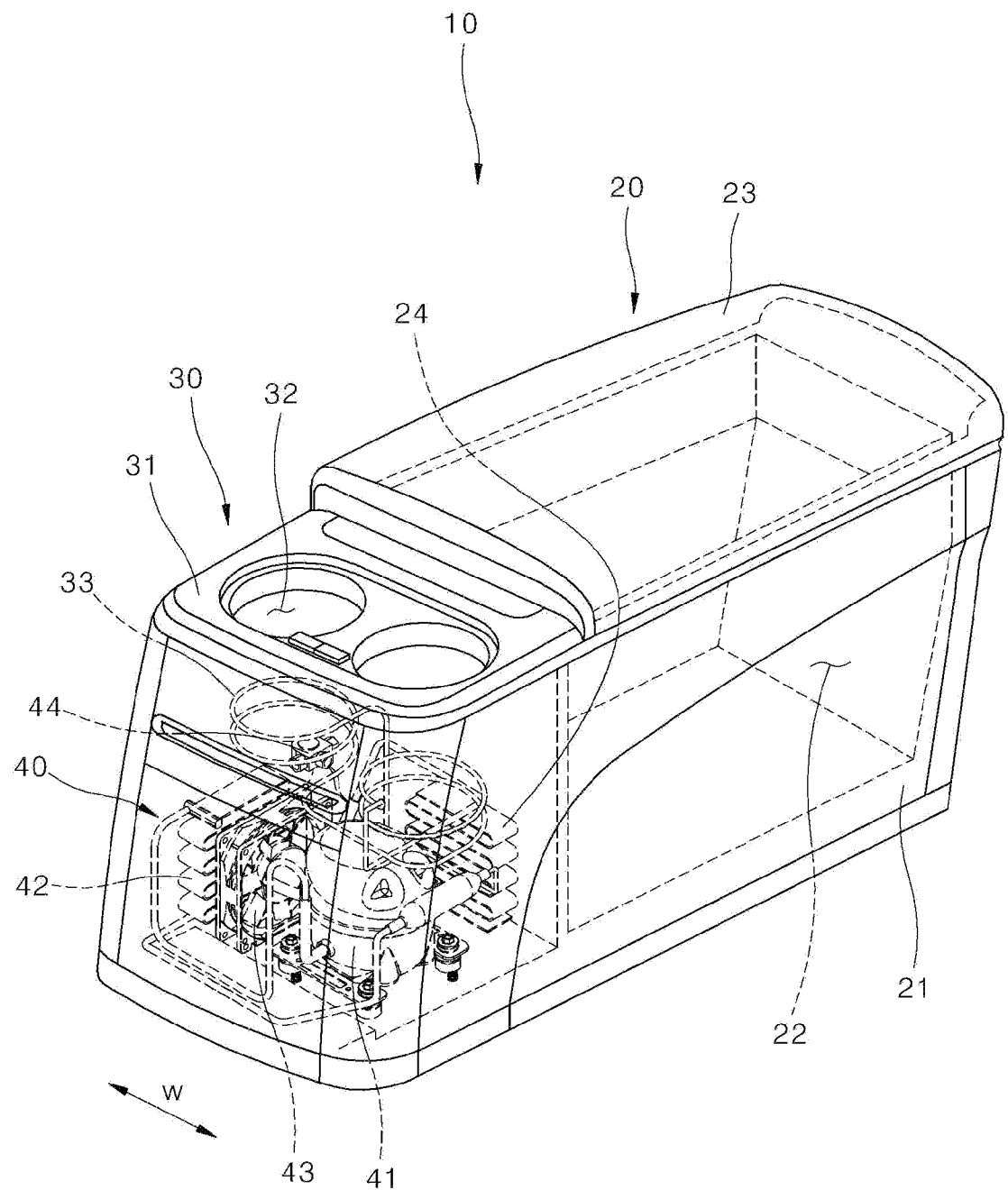

[FIG. 4]
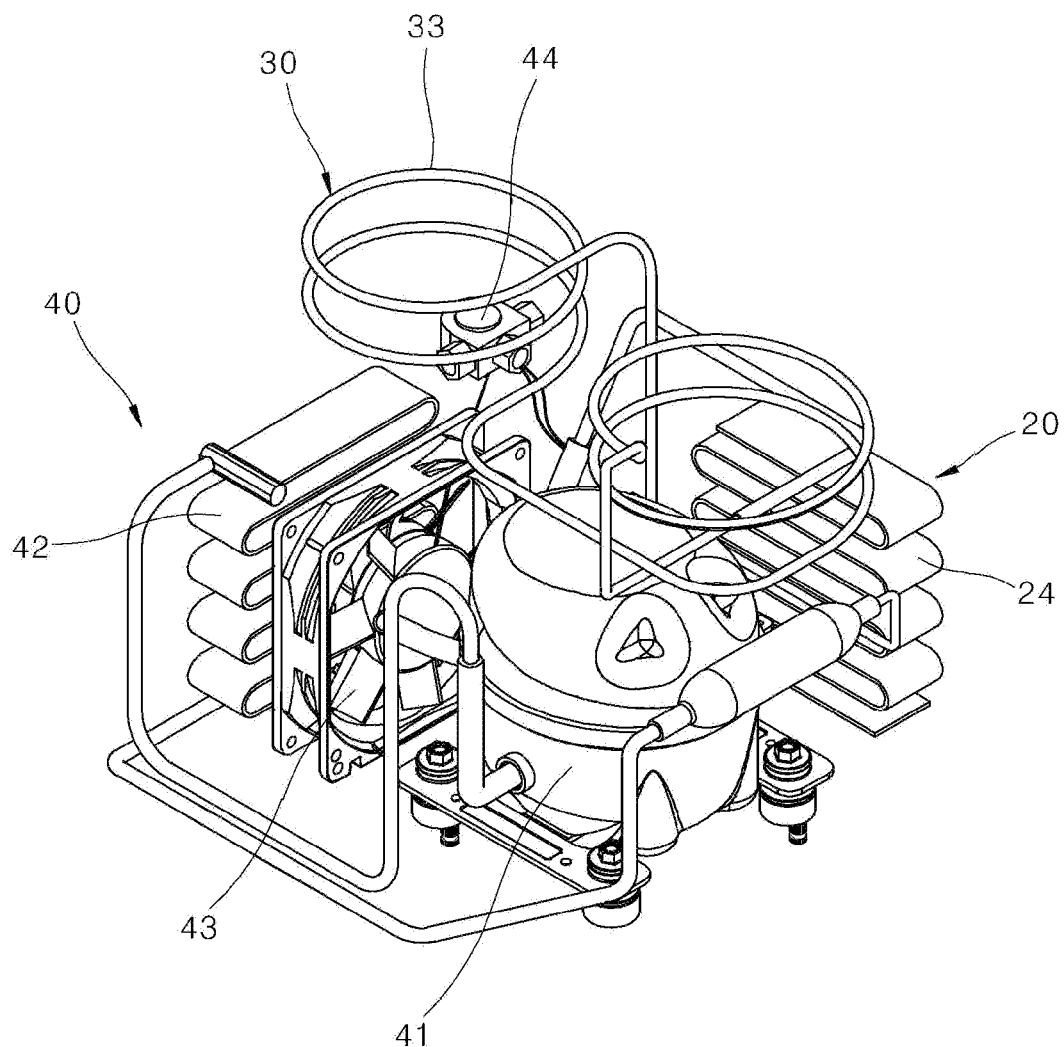

[FIG. 5]
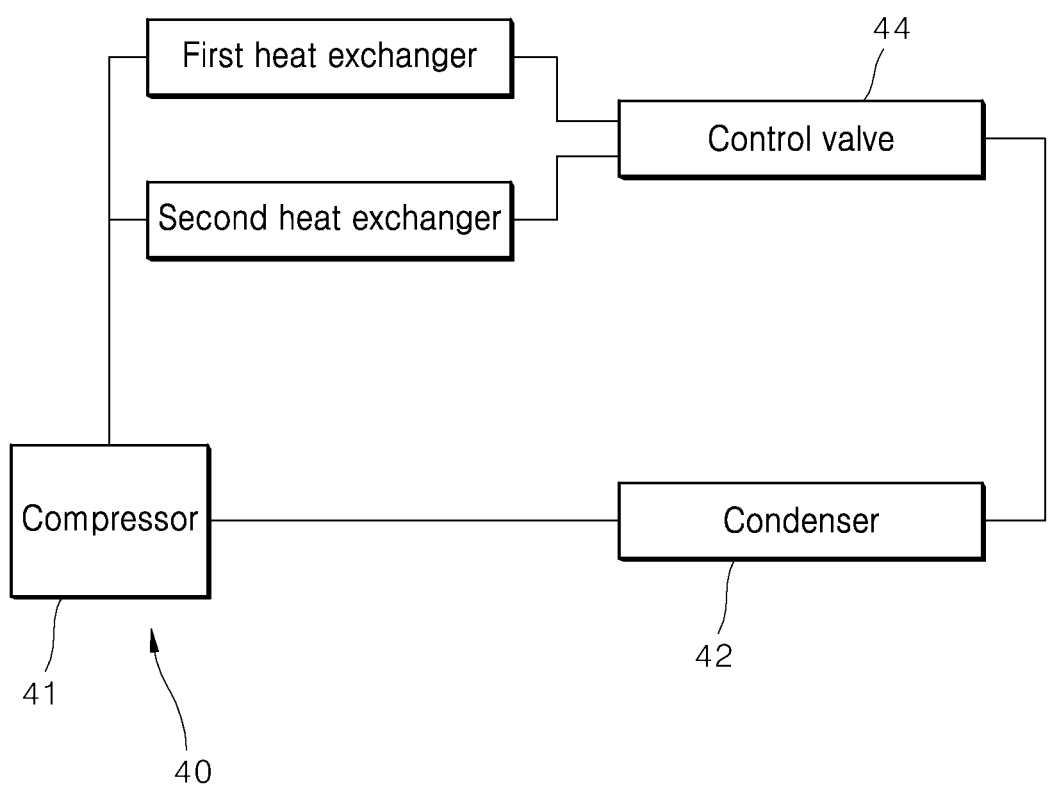

【FIG. 6】
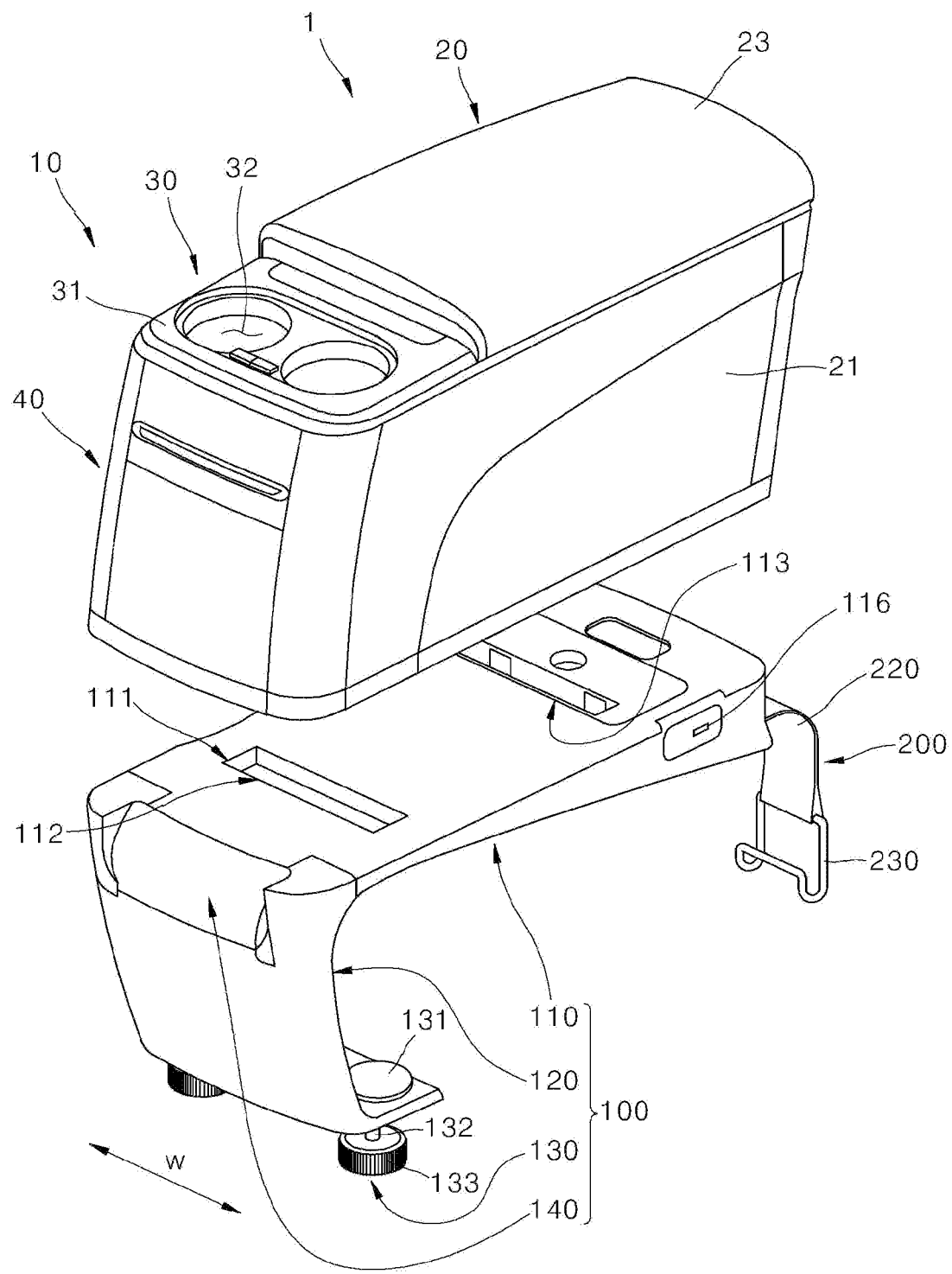

【FIG. 7】
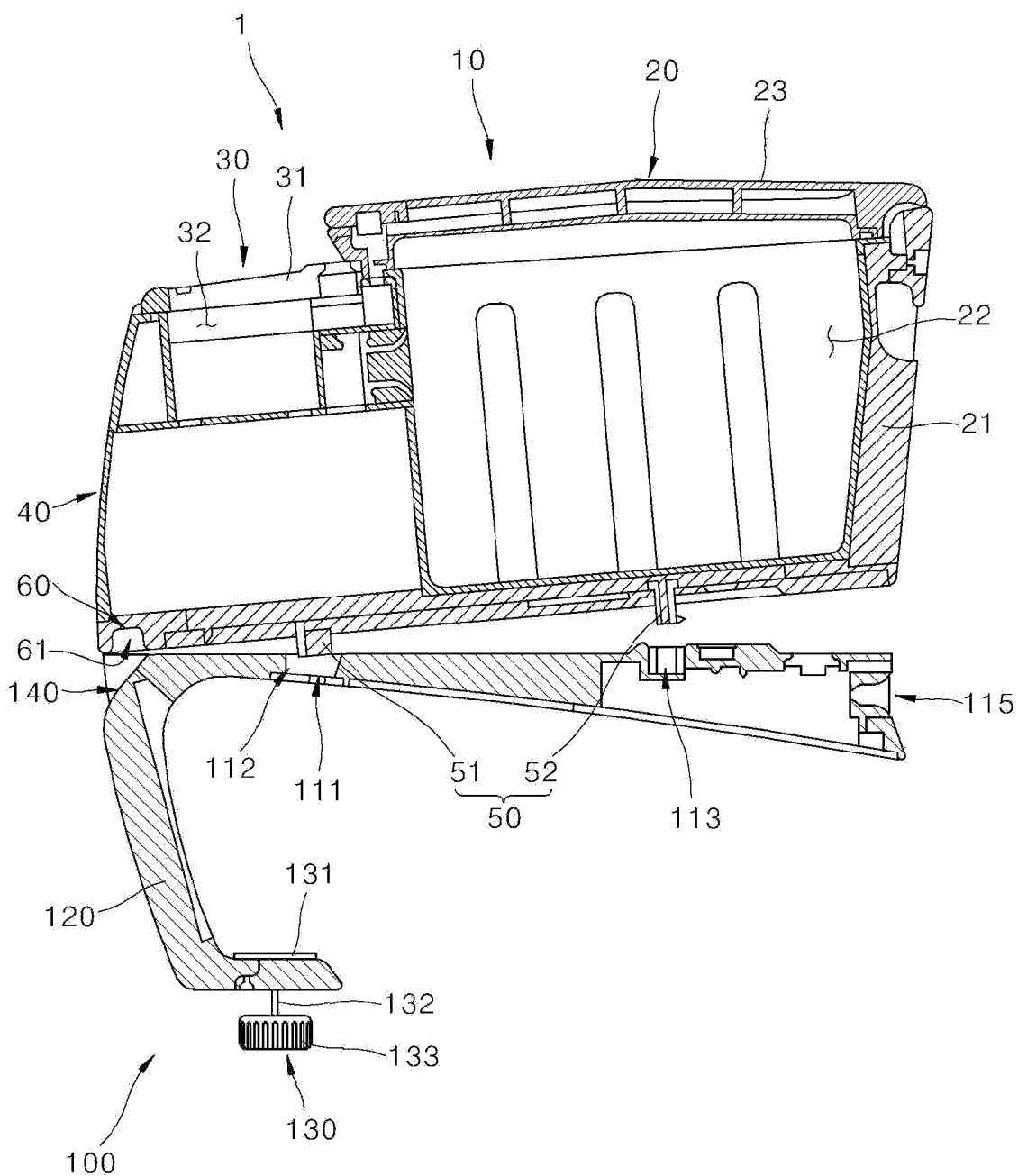

[FIG. 8]
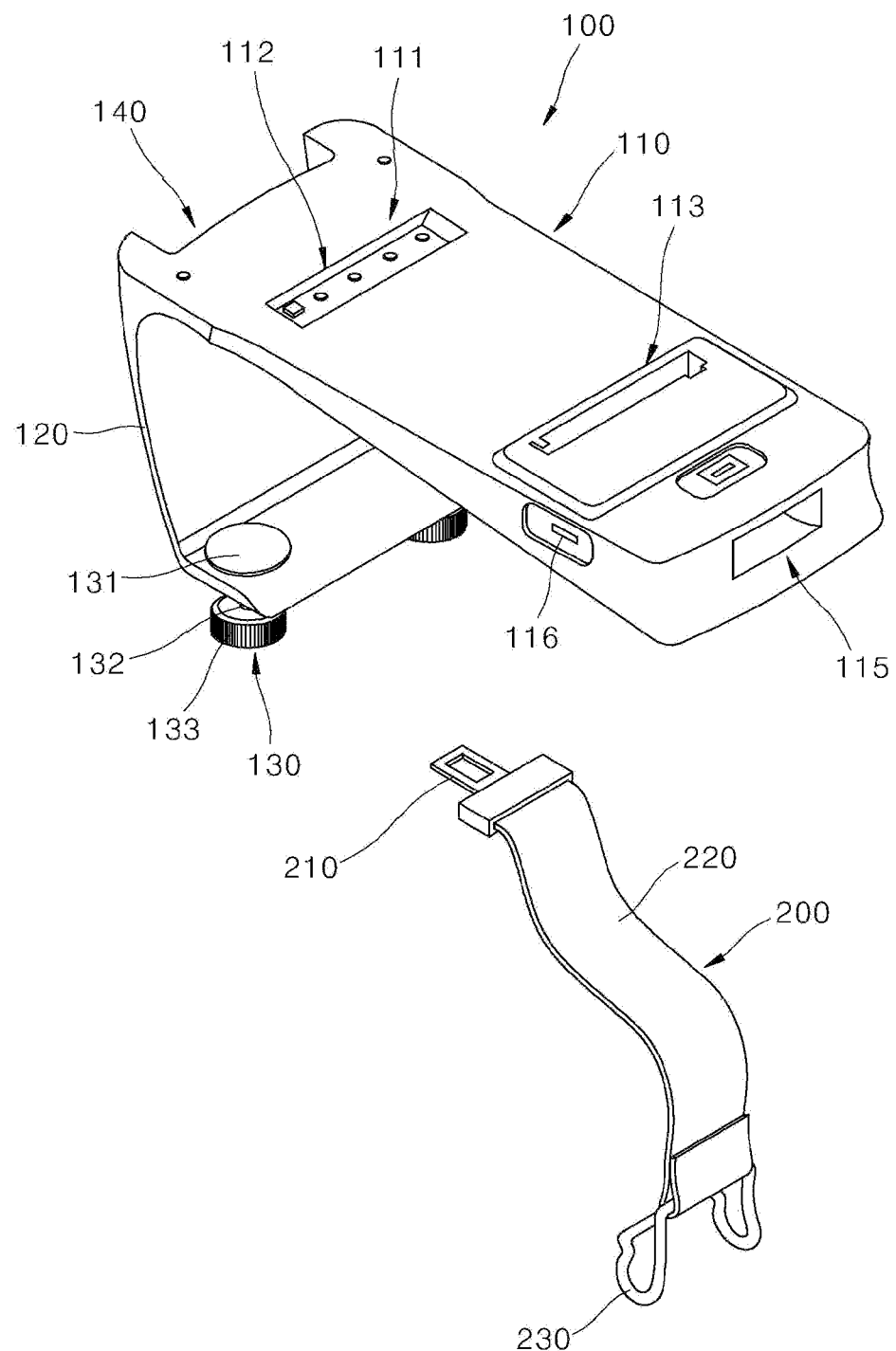

[FIG. 9]
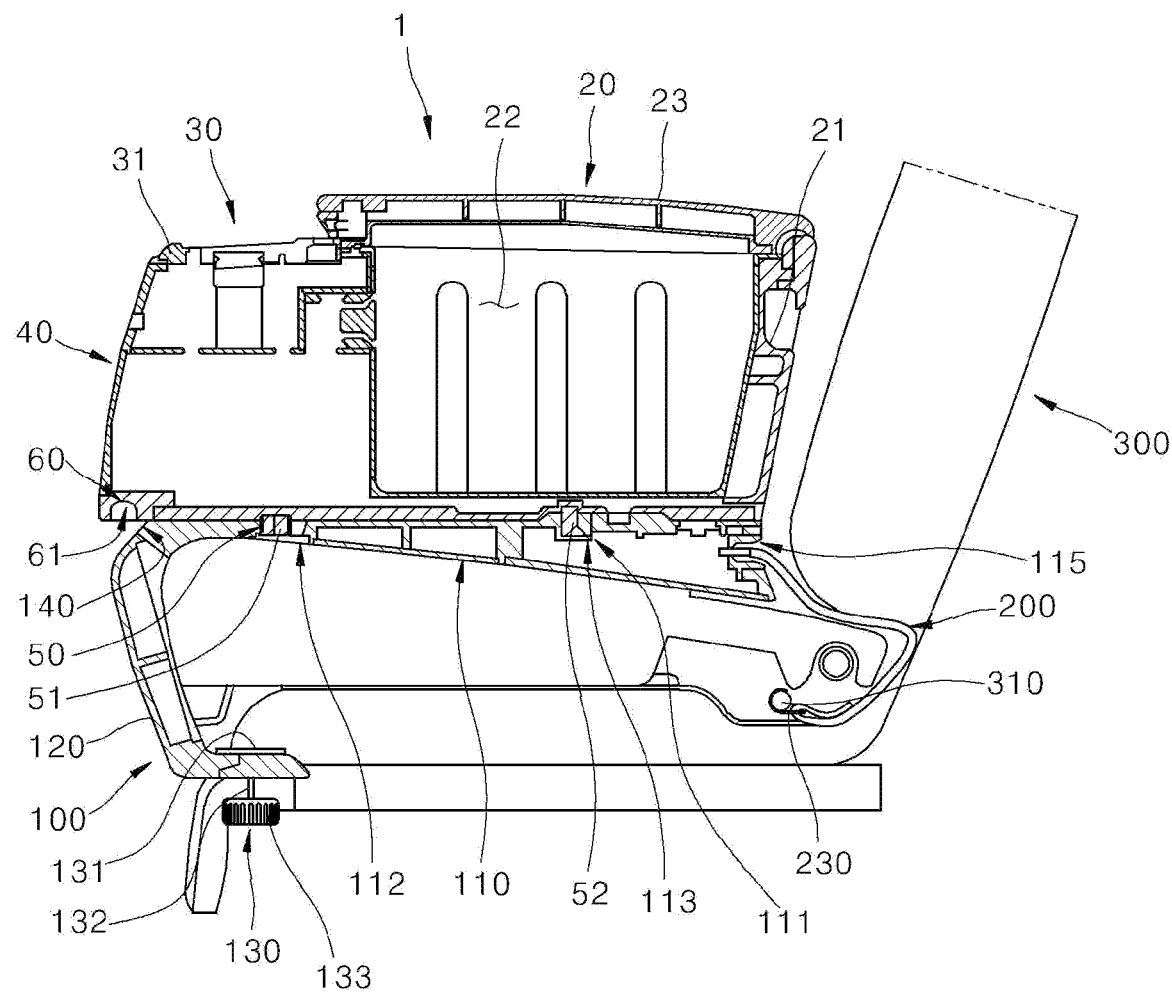

[FIG. 10]
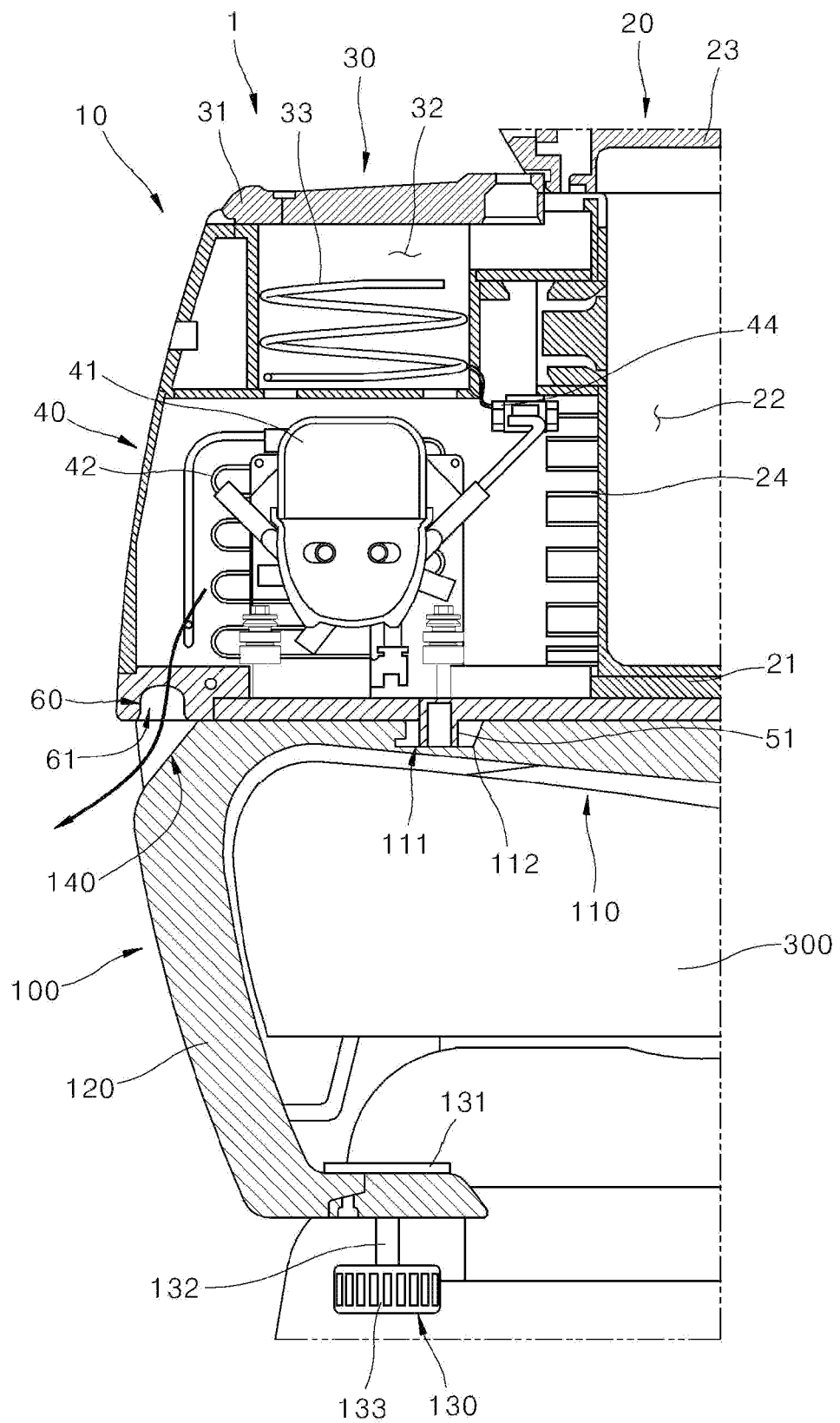

[FIG. 11]
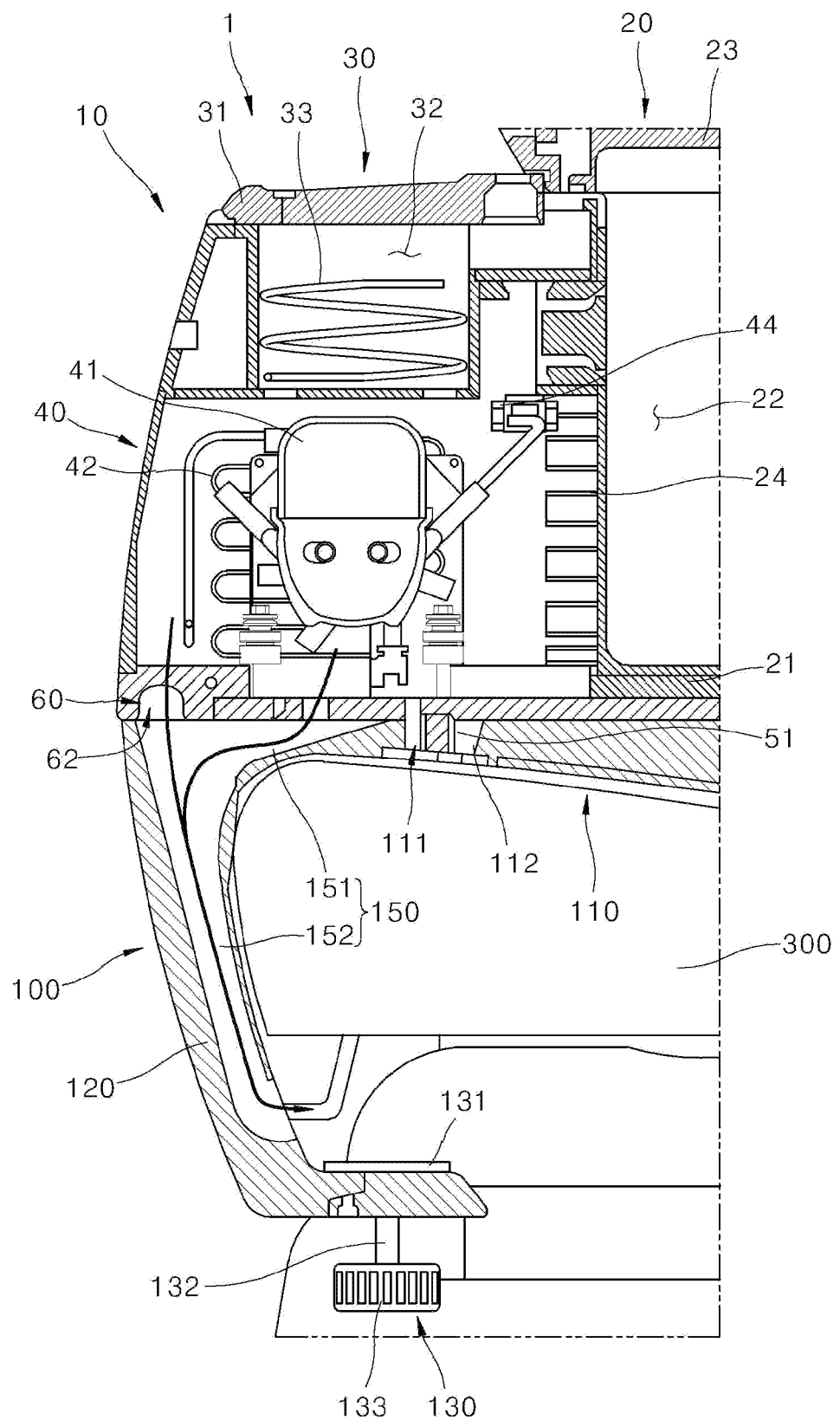

[FIG. 12]
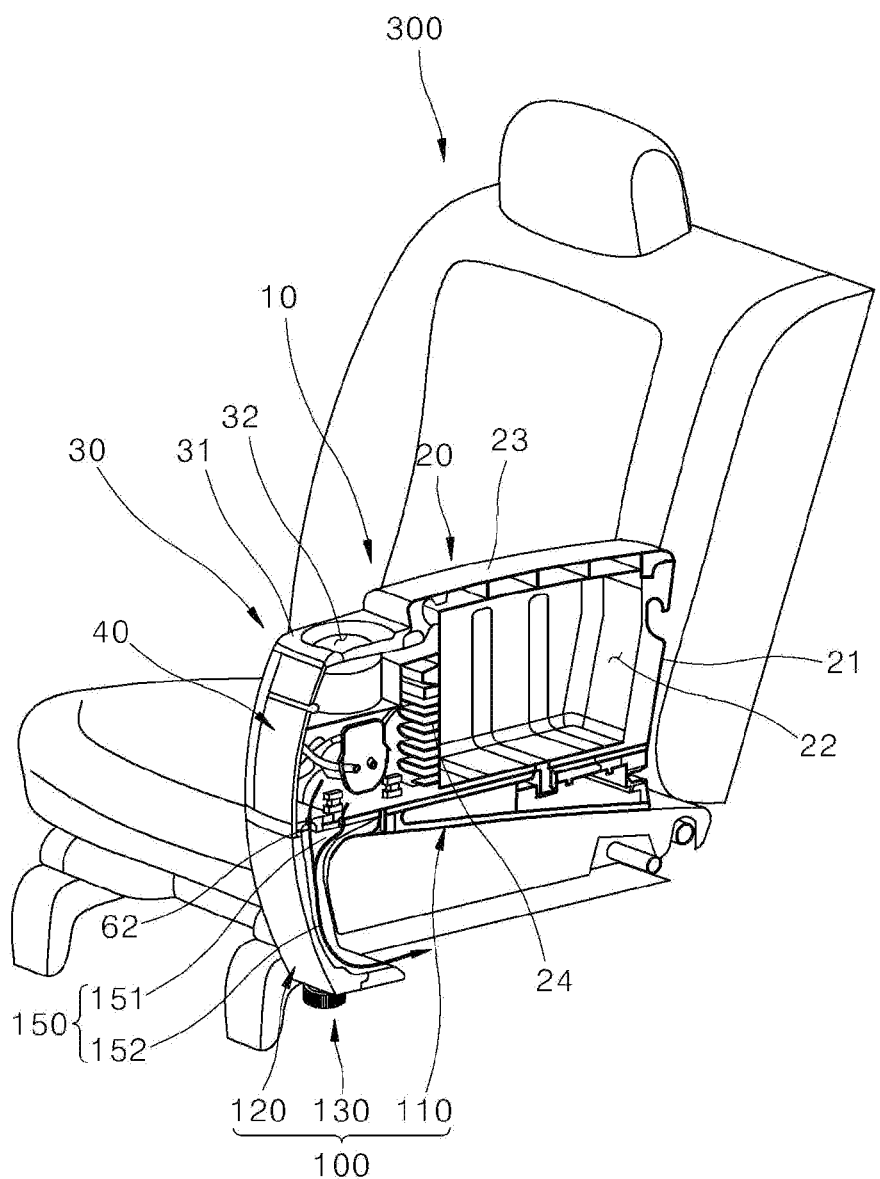

[FIG. 13]
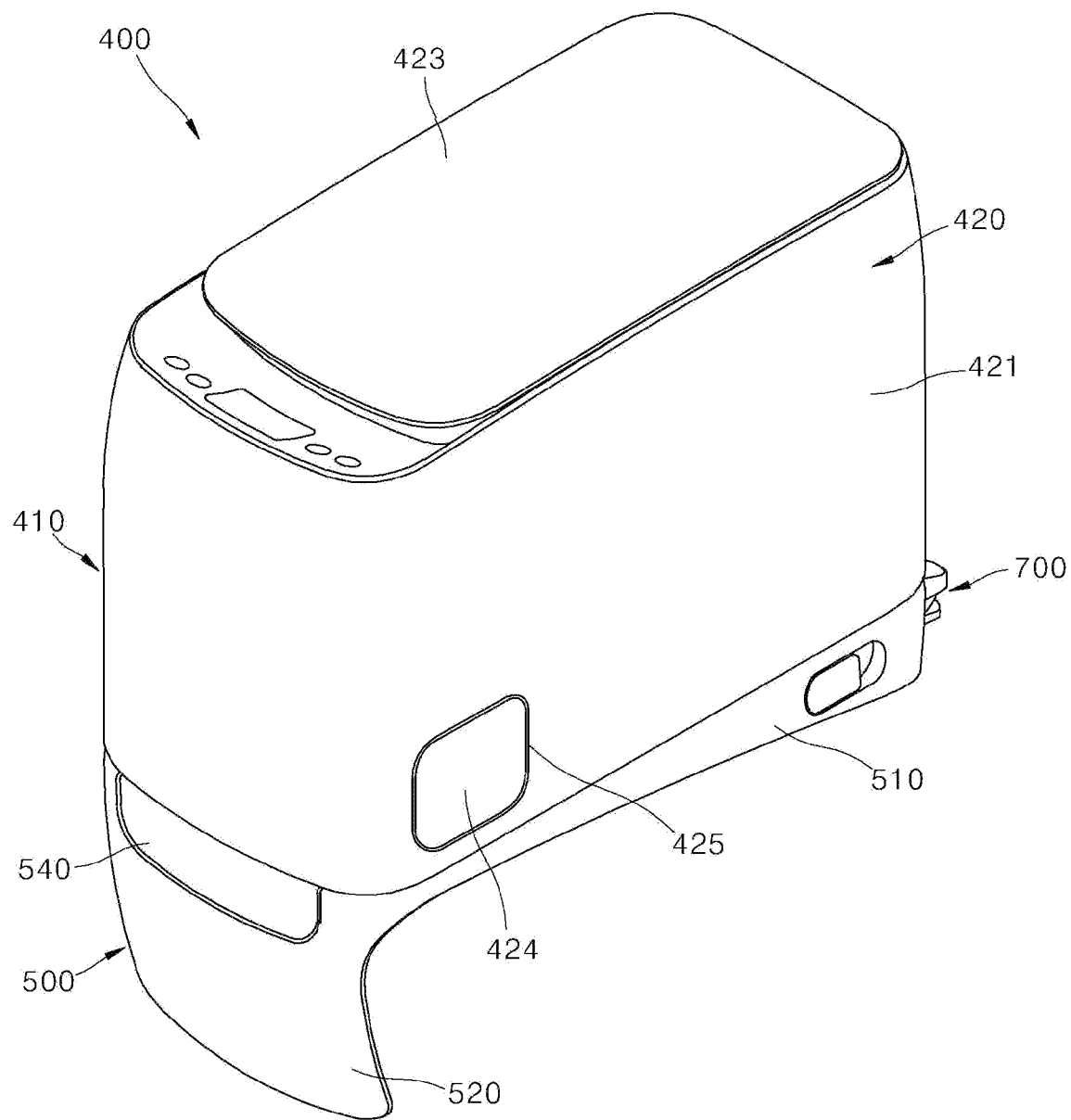

[FIG. 14]
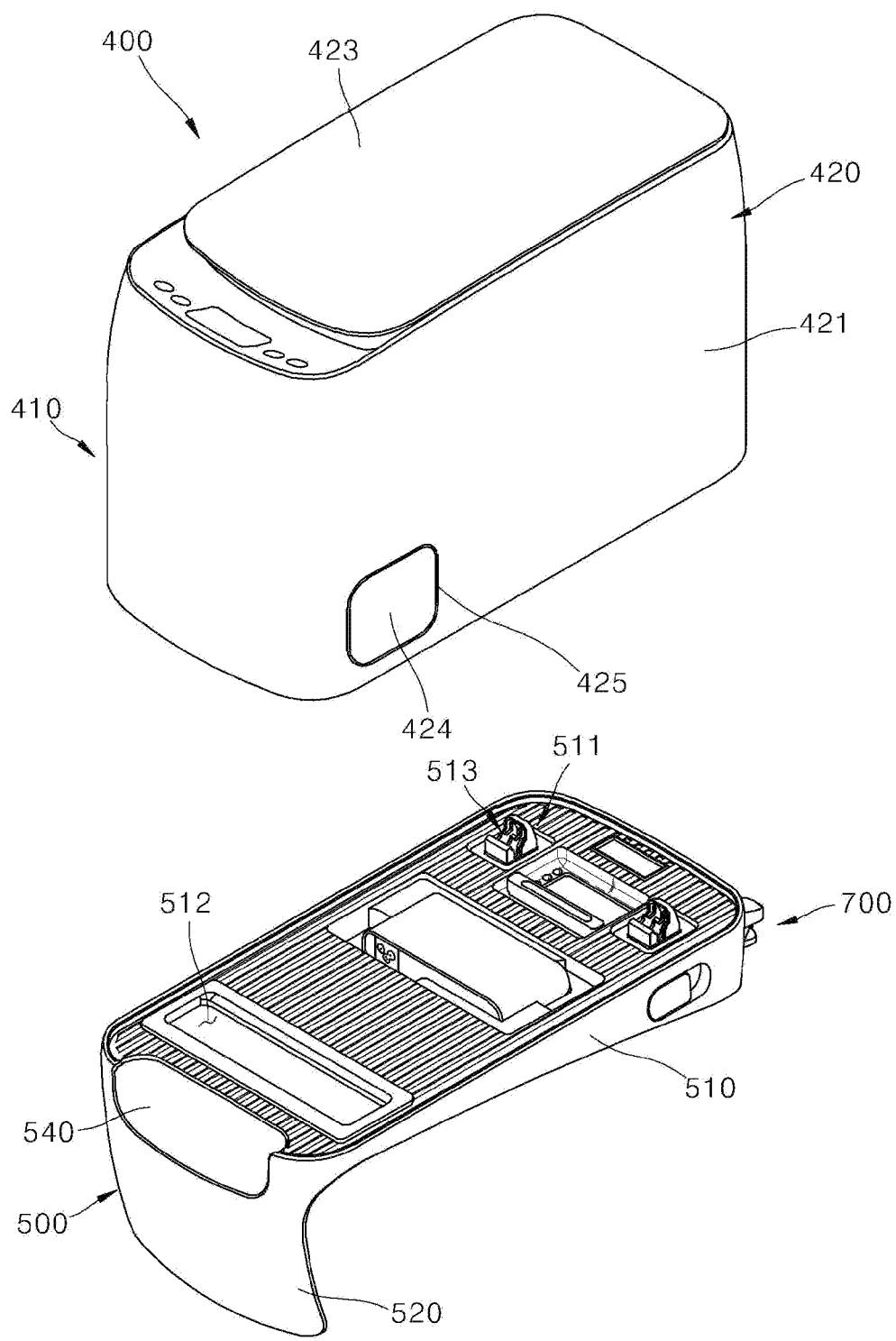

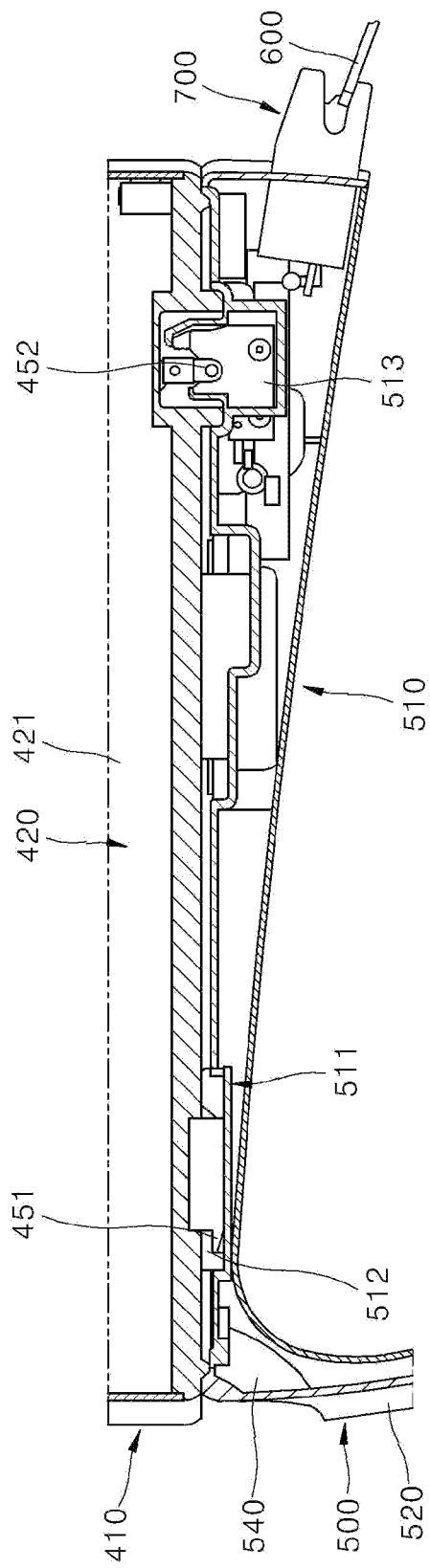
[FIG. 15]

[FIG. 16]
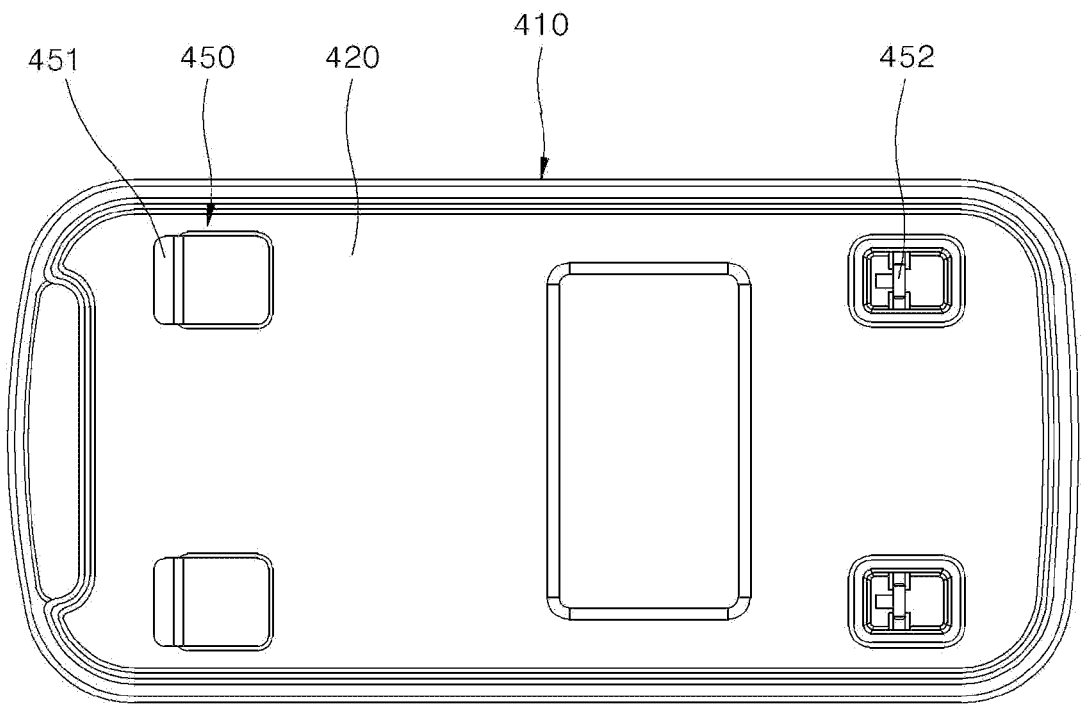
[FIG. 17]
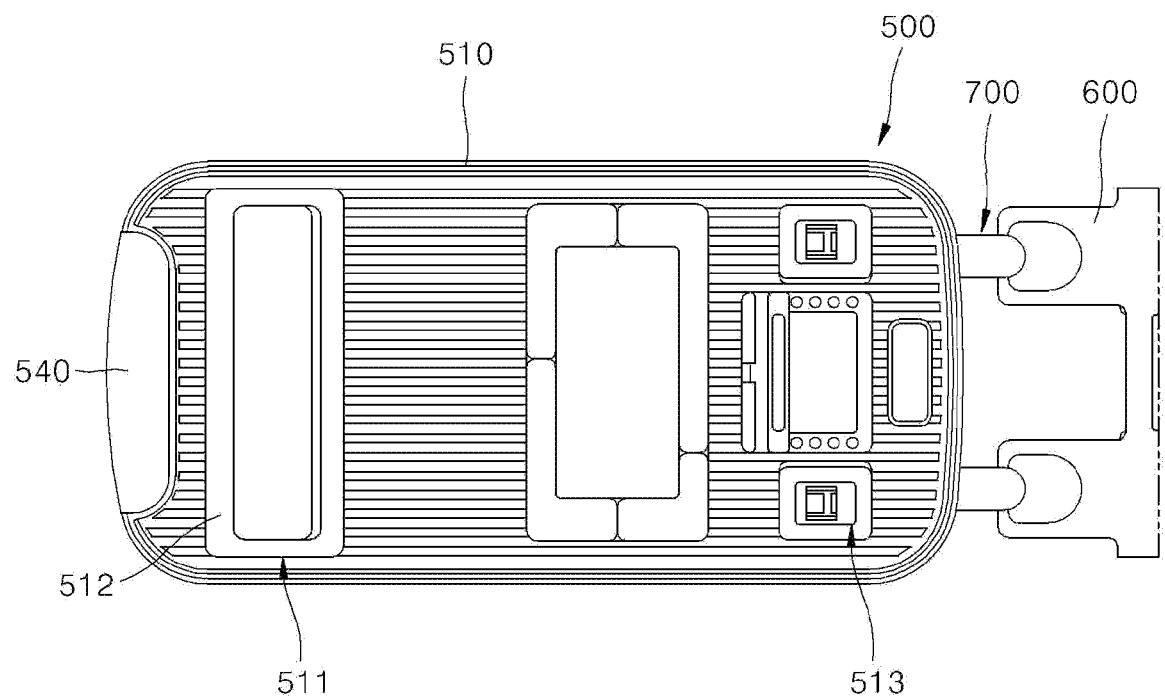

[FIG. 18]
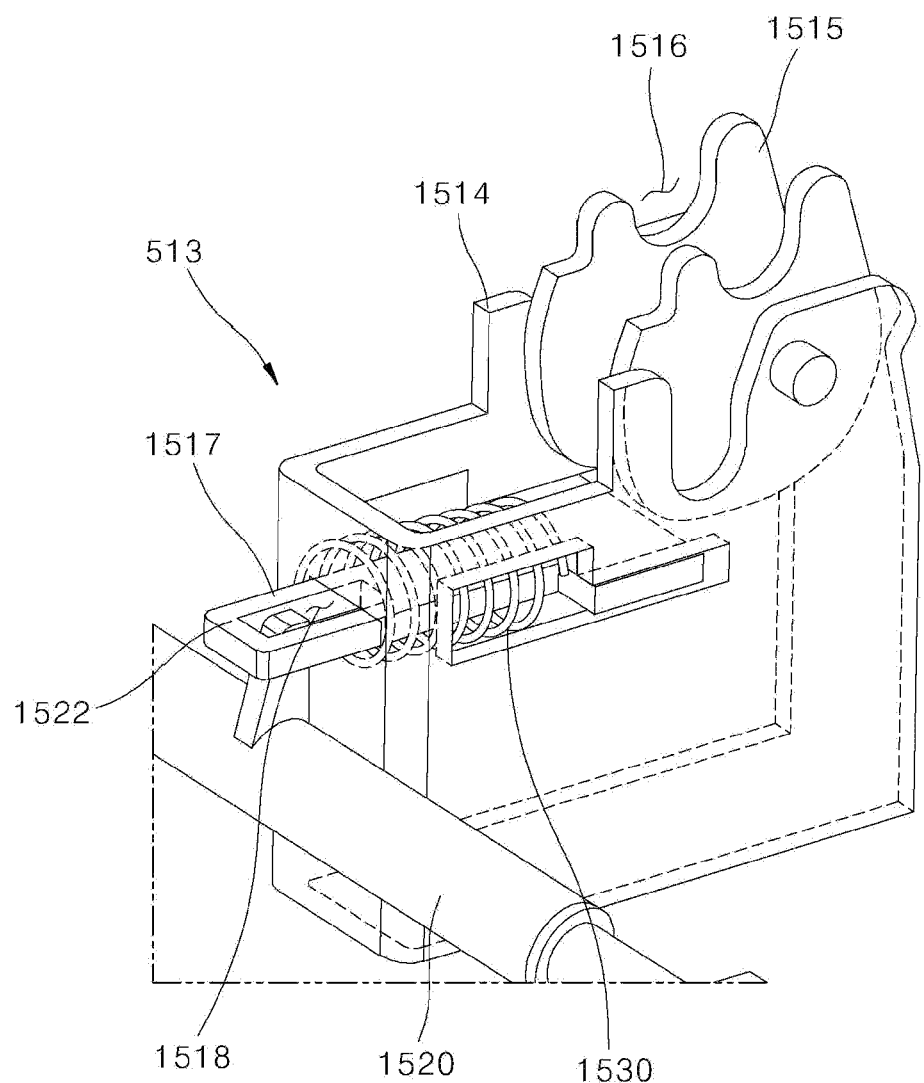

[FIG. 19]
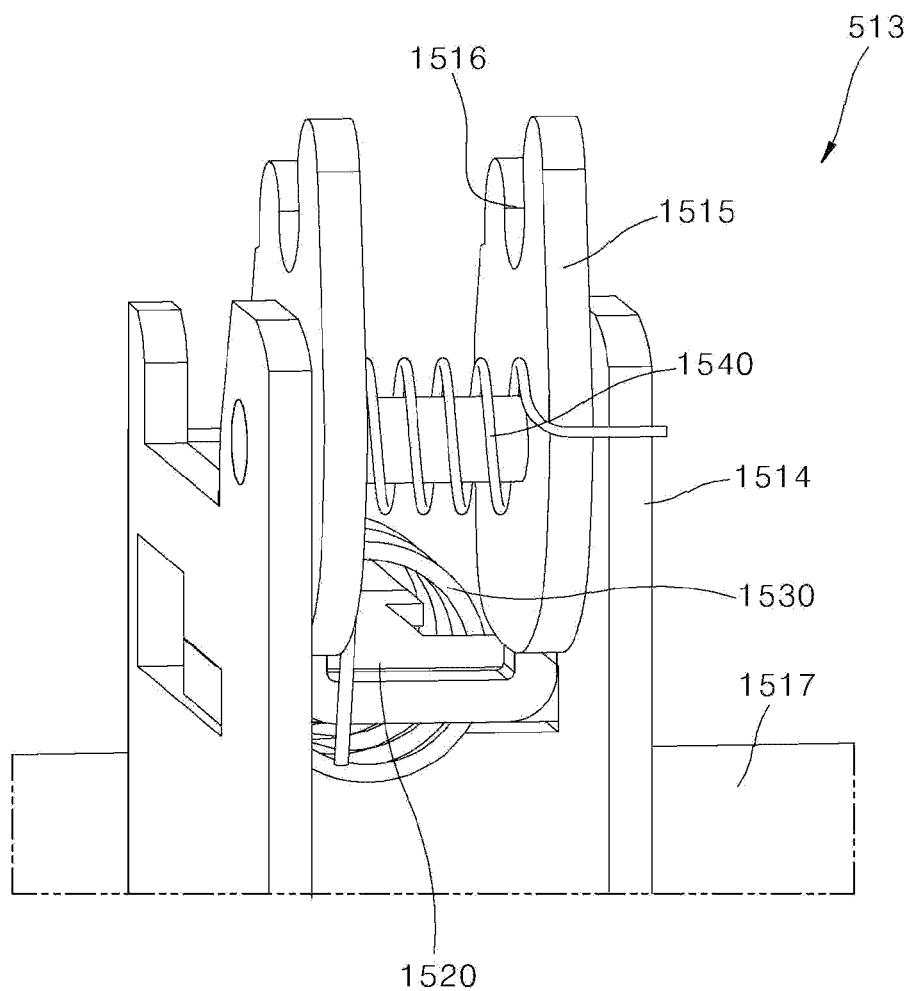

[FIG. 20]
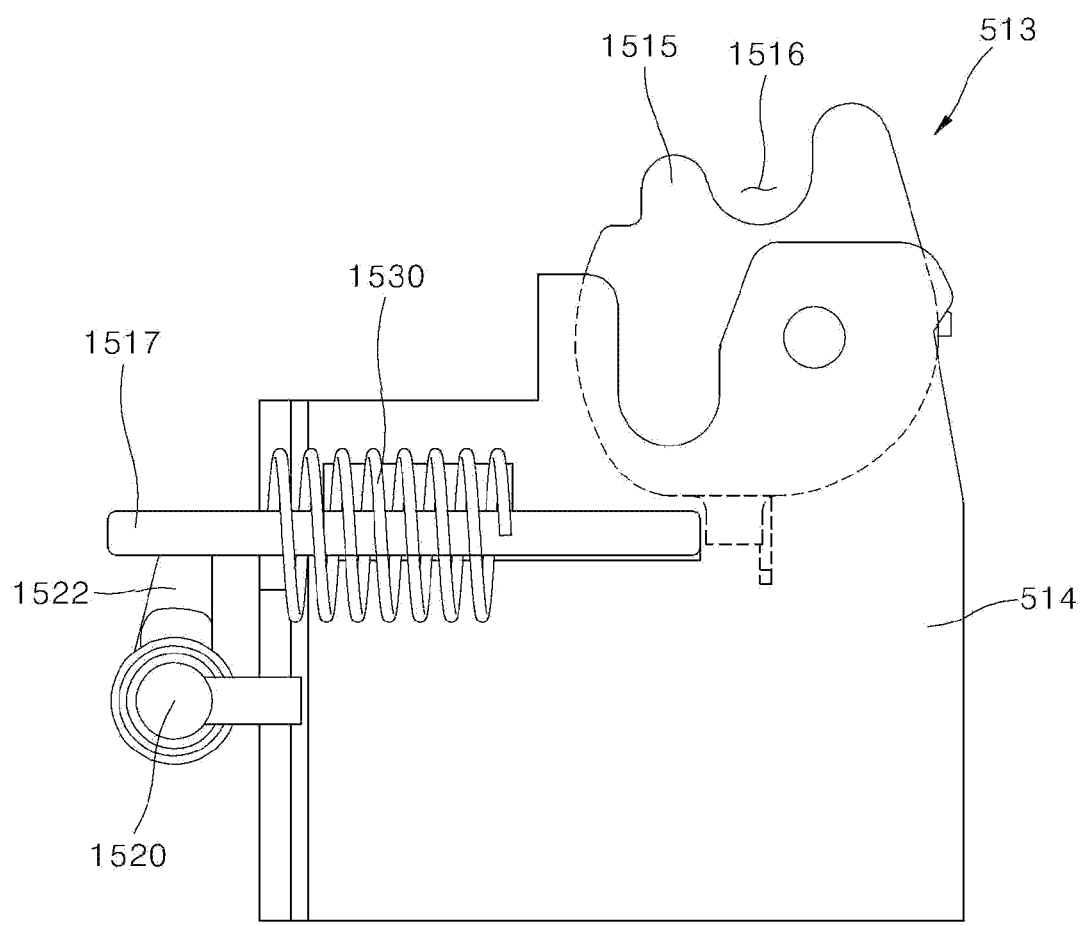

[FIG. 21]
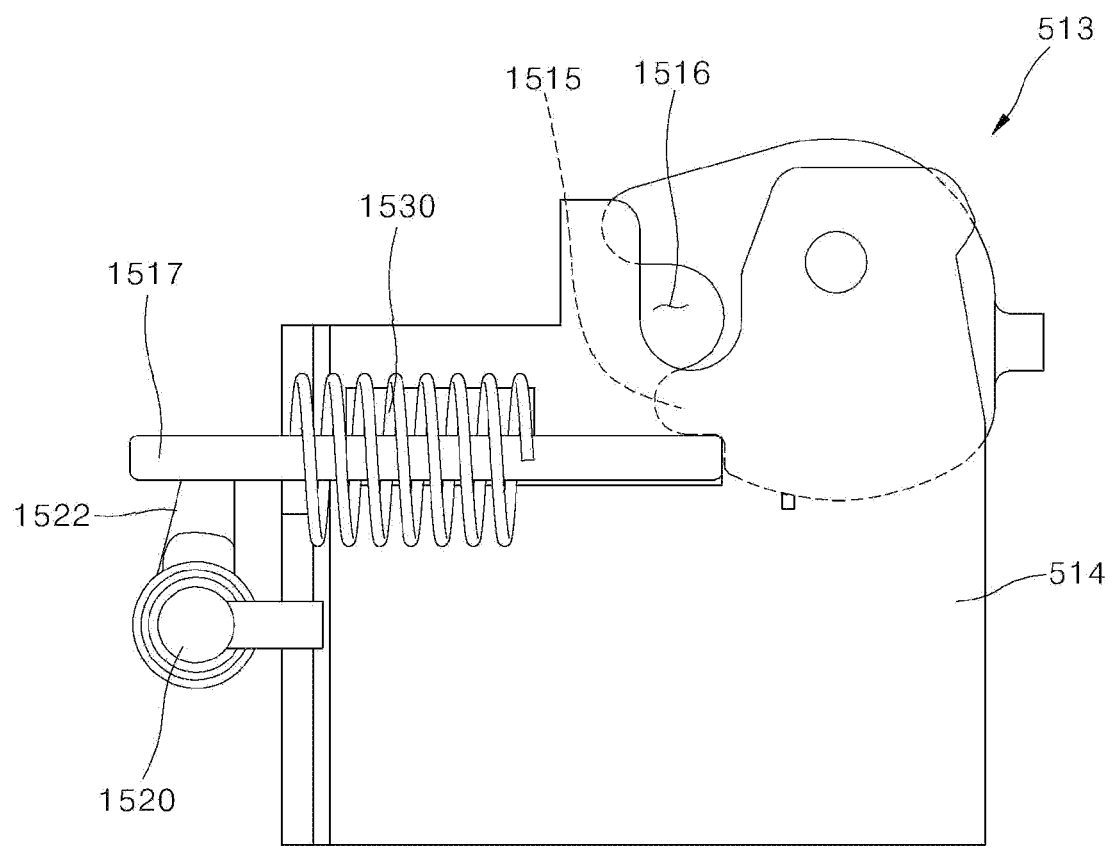

[FIG. 22]
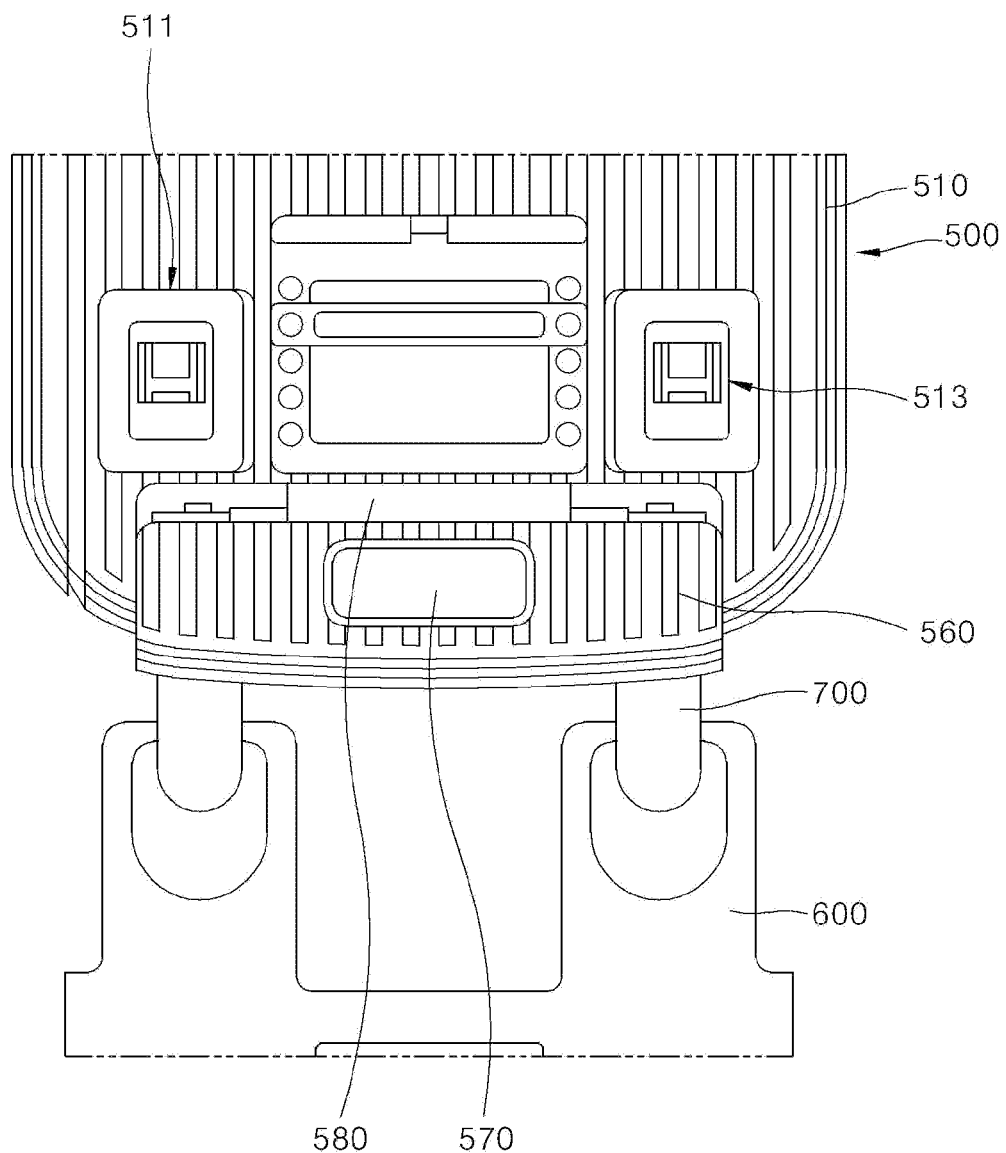

[FIG. 23]
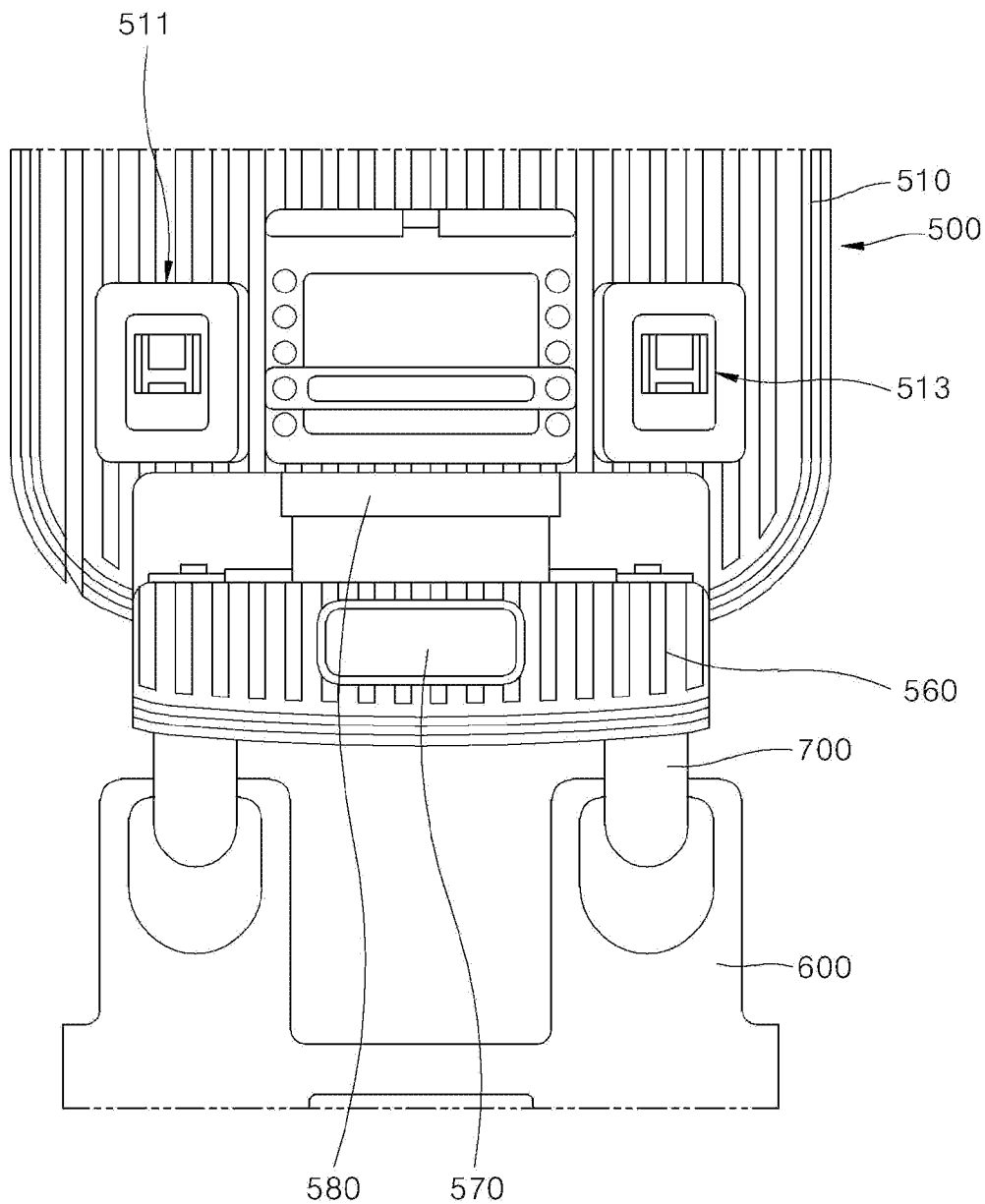

【FIG. 24】
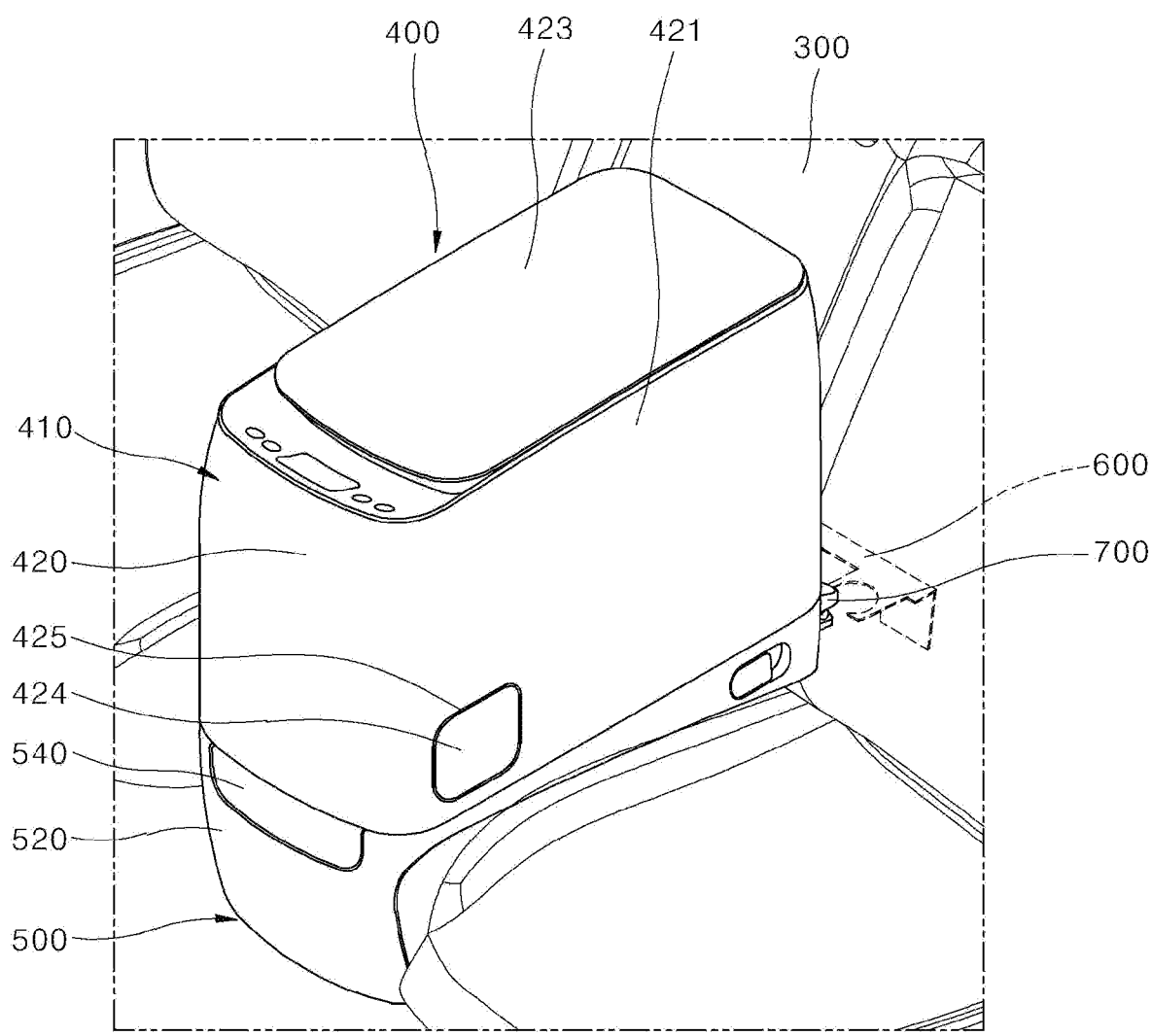

[FIG. 25]
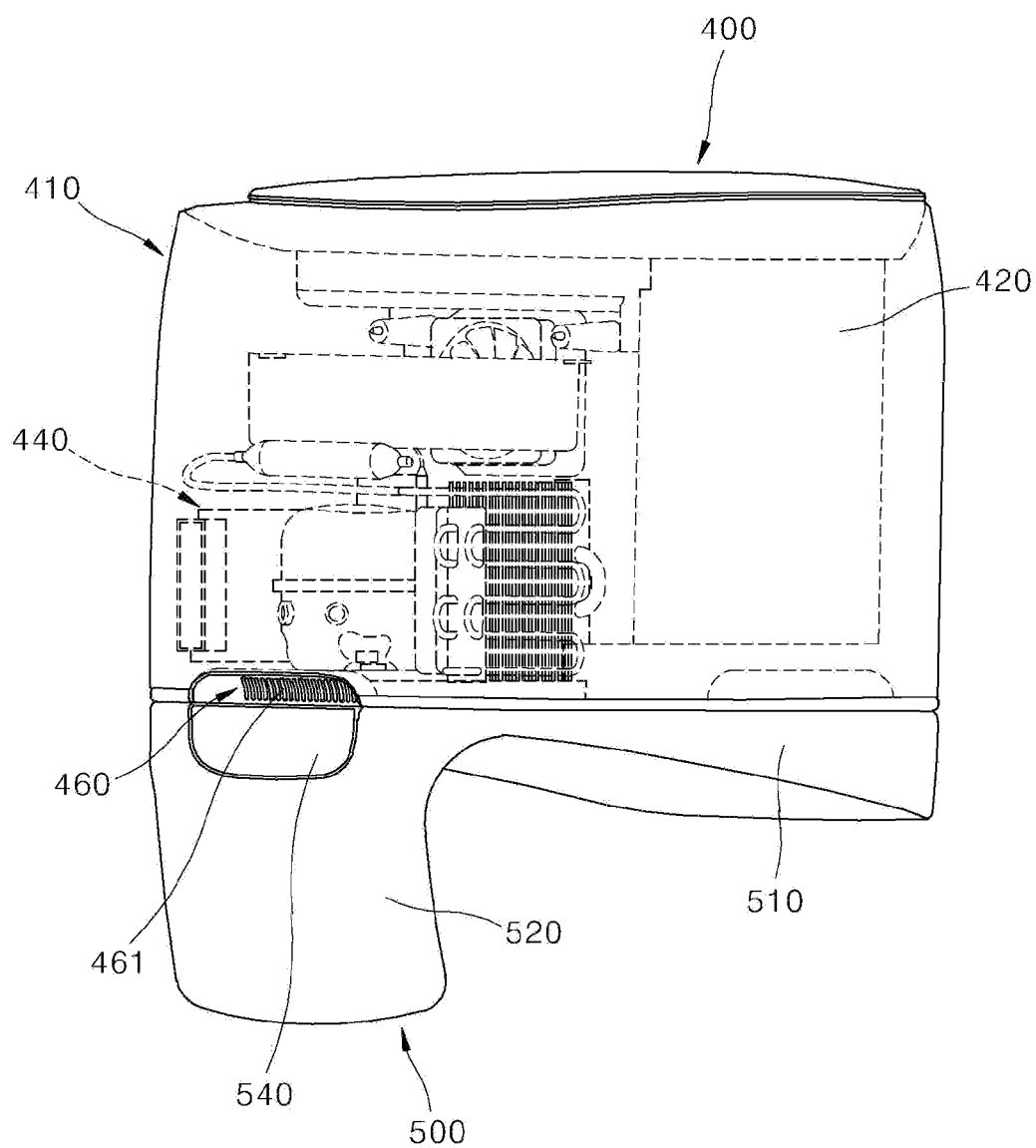

IN-VEHICLE REFRIGERATOR

CROSS-REFERENCE TO RELATED PATENT APPLICATIONS

This application is a U.S. National Stage Application under 35 U.S.C. § 371 of PCT Application No. PCT/KR2023/003699, filed Mar. 21, 2023, which claims priority to Korean Patent Application No. 10-2022-0035039, filed Mar. 21, 2022, whose entire disclosures are hereby incorporated by reference.

TECHNICAL FIELD

The present disclosure relates to a refrigerator for a vehicle, and in particularly, a refrigerator for a vehicle providing a refrigerator that can be attached to and detached from a seat of a vehicle.

BACKGROUND ART

Ordinarily, vehicles are transport means that are equipped with a motor fueled by gasoline or light oil, and run on a road by rotating wheels based on the power of the motor. A vehicle is provided with a plurality of seats, and a refrigerator is installed inside the vehicle.

Refrigerators keep food items or medicine cool or store them at a low temperature to prevent them from decaying. In recent years, a refrigerator is installed inside a vehicle, to satisfy a variety of user requirements.

An existing refrigerator for a vehicle cools beverages or food items, based on the Peltier effect. The Peltier effect involves joining two different sorts of metals and allowing electric current to pass through the metals, and bringing about heat generation and absorption in proportion to the current in the join portion between the metals.

In the case of supply of electric current, heat absorption and generation occur. At a time when an N-type semiconductor and a P-type semiconductor are alternately arranged and cooled or heated based on the Peltier effect, there is a temperature difference of about 40° C. The thermoelectric semiconductor is used to provide a refrigerator for a vehicle or an apparatus for cooling and heating.

However, a refrigerator using the Peltier effect cannot ensure excellent cooling efficiency and function as a refrigerator for a vehicle.

Additionally, in the case of a refrigerator for a vehicle, cold air leaks out of a storage part, at a time when the door of the storage part is opened to take out a beverage from the storage part, and the like, resulting in deterioration in cooling efficiency of the refrigerator. There is a need to improve cooling efficiency.

As a background art, a refrigerator for a car (registered on Jul. 3, 2008) is disclosed in KR Patent No. 10-0845153.

DESCRIPTION OF THE INVENTION

Technical Problems

The objective of the present disclosure to provide a refrigerator for a vehicle that can be attached to and detached from a seat for a vehicle.

The objective of the present disclosure is to provide a refrigerator for a vehicle that can ensure more excellent cooling efficiency than a refrigerator using the Peltier effect.

The objective of the present disclosure is to provide a refrigerator for a vehicle that can prevent the leakage of cold air in a storage part at a time when a cooled beverage is taken out.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

In a refrigerator for a vehicle according to the present disclosure, a discharge direction of air discharged from a refrigeration module is guided through a seat mounting part.

Specifically, air discharged from the refrigeration module may move downward and forward, through the seat mounting art, at a slant.

The refrigeration module is detachably installed at the seat mounting part, and the seat mounting part is fixed to a seat.

Specifically, since the refrigeration module is docked at the upper side of the seat mounting part, in the state where the seat mounting part is fixed to the upper side of the seat, the refrigeration module is readily attached and detached.

Additionally, since heat exchange is performed with refrigerants, cooling efficiency improves further than that of a refrigerator using the Peltier effect.

Specifically, since a machine compartment supplies refrigerants to a first heat exchanger of a storage part, cooling efficiency improves further than that of a refrigerator using the Peltier effect.

A refrigerator for a vehicle in the present disclosure comprises a refrigeration module having a refrigeration space therein, a seat mounting part sitting on a seat for a vehicle, and having a docking part connecting to the refrigeration module, on an upper surface thereof, and a fixation belt part one side of which connects to the seat mounting part and the other side of which connects to a structure of the seat, to limit a movement of the seat mounting part.

The refrigeration module comprises a storage part that is provided with a first heat exchanger supplied with refrigerants and configured to exchange heat with a surrounding object, and has an inner space for storing an item, therein, and a machine compartment that is installed in a space separate from the storage part, and supplies refrigerants to the first heat exchanger.

The storage part comprises a storage body that has an inner space for refrigerating and storing an item at a low temperature, and has an open upper side, and a storage door that is installed at an upper side of the storage body and opens and closes the inner space.

The first heat exchanger is installed inside the storage body facing the inner space.

The machine compartment comprises a compressor that connects to the first heat exchanger, a condenser that receives refrigerants through the compressor, and cools refrigerants while exchanging heat with air, and an air blowing part that forms a flow of air passing through the condenser.

The machine compartment further comprises a control valve that connects to the condenser and the first heat exchanger, and controls a supply of refrigerants having passed through the condenser to the first heat exchanger.

The seat mounting part comprises a mounting housing that is disposed at an upper side of the seat, extends in a front-rear direction of the seat, and includes the docking part, and an extension body that extends downward from one side of the mounting housing in a front-rear direction thereof, and then bends.

The docking part comprises a first docking part that forms a groove part extending in a widthwise direction of the mounting housing, and a second docking part that is disposed at a rear of the first docking part, and held and coupled to a hold protrusion provided at the refrigeration module or decoupled from the hold protrusion, based on a rotation motion.

The second docking part comprises a docking housing that is fixed to the mounting housing, a locking plate that is rotatably installed at the docking housing, and provided with a locking plate into which the hold protrusion is inserted and held, a moving bar that moves linearly, and controls a rotation motion of the locking plate, and an operating bar that is coupled to the moving bar, and moves the moving bar, based on a rotation motion.

The operating bar and the moving bar are installed in such a way that the operating bar and the moving bar cross each other, and a side projection protruding outside the operating bar is inserted into an inner hole provided at the moving bar and is connected to the moving bar.

The refrigeration module further comprises a hold protrusion that protrudes downward toward the docking part and is held by the docking part.

The hold protrusion comprises a first hold protrusion that protrudes to a lower side of the refrigeration module and is held by the docking part, and a second hold protrusion that is disposed at a rear of the first hold protrusion, and protrudes to the lower side of the refrigeration module and is held by the docking part.

The fixation belt part is fastened to a rear surface fixation part installed at a rear of the seat mounting part.

A refrigerator for a vehicle in the present disclosure comprises a refrigeration module provided with a storage part that is provided with a first heat exchanger and has an inner space for storing an item, and a machine compartment that supplies refrigerants to the first heat exchanger, a seat mounting part configured to sit on a seat for a vehicle, and provided with a docking part connecting to the refrigeration module, and a fixation belt part one side of which connects to the seat mounting part and the other side of which connects to a structure of the seat, to limit a movement of the seat mounting part.

Additionally, a discharge direction of air discharged to a lower side of the refrigeration module is guided along the seat mounting part.

The refrigeration module comprises a discharge hole part that connects to the machine compartment and is a passage of air discharged from the machine compartment.

The seat mounting part comprises a mounting housing that is disposed at an upper side of the seat, extends in a front-rear direction of the seat, and comprises the docking part, and an extension body that extends downward from one side of the mounting housing in a front-rear direction thereof, and then bends toward a rear of the seat.

The seat mounting part further comprises a first discharge guide part that forms a groove part having a concave shape, at the mounting housing disposed at a lower side of the discharge hole part, and guides air discharged to the lower side of the discharge hole part downward, toward a front of the mounting housing, at a slant.

The docking part comprises a first docking part that forms a groove part extending in a widthwise direction of the mounting housing, and a second docking part that is disposed at a rear of the first docking part, and held and coupled to a hold protrusion provided at the refrigeration module or decoupled from the hold protrusion, based on a rotation motion.

The second docking part comprises a docking housing that is fixed to the mounting housing, a locking plate that is rotatably installed at the docking housing, and provided with a locking plate into which the hold protrusion is inserted and held, a moving bar that moves linearly, and controls a rotation motion of the locking plate, and an operating bar that is coupled to the moving bar, and moves the moving bar, based on a rotation motion.

Further, the operating bar and the moving bar are installed in such a way that the operating bar and the moving bar cross each other, and a side projection protruding outside the operating bar is inserted into an inner hole provided at the moving bar and is connected to the moving bar.

Advantageous Effects

As a refrigerator for a vehicle according to the present disclosure performs heat exchange with refrigerants, the cooling efficiency of the refrigerator improves further than that of a refrigerator using the Peltier effect, thereby enhancing user satisfaction.

As a refrigeration module is detachably installed at a seat mounting part, the refrigeration module can be used for camping, thereby enhancing user satisfaction.

Further, the discharge of air discharged from the refrigeration module is guided by the seat mounting part, thereby providing a pleasant environment.

Specific effects are described along with the above-described effects in the section of detailed description.

BRIEF DESCRIPTION OF THE DRAWINGS

FIG. 1 is a perspective view showing that a refrigerator for a vehicle in one embodiment is mounted on a seat.

FIG. 2 is a side view showing that the refrigerator for a vehicle in one embodiment is mounted on a seat.

FIG. 3 is a perspective view showing a refrigeration module in one embodiment.

FIG. 4 is a perspective view showing a main configuration of the refrigeration module in one embodiment.

FIG. 5 is a block diagram showing a main configuration of the refrigeration module in one embodiment.

FIG. 6 is a perspective view showing that the refrigeration module in one embodiment is separated from a seat mounting part.

FIG. 7 is a cross-sectional view showing that the refrigeration module in one embodiment is separated from a seat mounting part.

FIG. 8 is a perspective view showing a seat mounting part and a fixation belt part in one embodiment.

FIG. 9 is a cross-sectional view showing that the refrigerator for a vehicle in one embodiment is mounted on a seat.

FIG. 10 is a cross-sectional view showing that air discharged to the lower side of the refrigeration module in one embodiment is discharged forward and downward, at a slant, along a seat mounting part.

FIG. 11 is a cross-sectional view showing that air discharged to the lower side of the refrigeration module in one embodiment is discharged toward the rear of a seat, along a seat mounting part.

FIG. 12 is a partially cut perspective view showing that air discharged to the lower side of the refrigeration module in one embodiment is discharged toward the rear of a seat, along a seat mounting part.

FIG. 13 is a perspective view showing a refrigerator for a vehicle in another embodiment.

FIG. 14 is an exploded perspective view showing the refrigerator for a vehicle in another embodiment.

FIG. 15 is a cross-sectional view showing that a refrigeration module is connected to a seat mounting part in another embodiment.

FIG. 16 is a bottom view showing a refrigeration module in another embodiment.

FIG. 17 is a plan view showing a seat mounting part in another embodiment.

FIG. 18 is a perspective view showing a second docking part in another embodiment.

FIG. 19 is a perspective view showing that a tension spring is installed at the second docking part in another embodiment.

FIG. 20 is a front view showing that the second docking part in another embodiment is installed in the state of being open.

FIG. 21 is a front view showing that the second docking part in another embodiment is installed in the state of being locked.

FIG. 22 is a plan view showing that a moving plate is moved in a direction in which the moving plate provided at the seat mounting part in another embodiment becomes far from a mounting house.

FIG. 23 is a plan view showing that a moving plate is moved further in a direction in which the moving plate provided at the seat mounting part in another embodiment becomes far from a mounting house.

FIG. 24 is a perspective view showing that the refrigerator for a vehicle in another embodiment is mounted on a seat.

FIG. 25 is a perspective view showing a discharge hole part and a first discharge guide part in another embodiment.

DETAILED DESCRIPTION OF EXEMPLARY EMBODIMENTS

The above-described aspects, features and advantages are specifically described hereinafter with reference to accompanying drawings such that one having ordinary skill in the art to which the subject matter of the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereinafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

When any one component is described as being "in the upper portion (or the lower portion)" or "on (or under)" another component, any one component can be directly on (or under) another component, and an additional component can be interposed between the two components.

When any one component is described as being "connected", "coupled" or "connected" to another component, any one component can be directly connected or coupled to another component, but an additional component can be "interposed" between the two components or the two components can be "connected", "coupled" or "connected" by an additional component.

In the disclosure, each component can be provided as a single one or a plurality of ones, unless explicitly indicated otherwise.

In the disclosure, singular forms include plural forms as well, unless explicitly indicated otherwise. In the disclosure, the terms "being comprised of", "comprise", and the like do not imply necessarily including stated components or stated steps and imply excluding some of the stated components or stated steps or including additional components or additional steps.

Throughout the disclosure, the terms "A and/or B" as used herein can denote A, B or A and B, and the terms "C to D" can denote C or greater and D or less, unless stated to the contrary.

Hereinafter, a refrigerator for a vehicle 1 in one embodiment is described.

[Entire Configuration of Refrigerator for Vehicle]

FIG. 1 is a perspective view showing that a refrigerator for a vehicle 1 in one embodiment is mounted on a seat 300, FIG. 2 is a side view showing that the refrigerator for a vehicle 1 in one embodiment is mounted on the seat 300, and FIG. 3 is a perspective view showing a refrigeration module 10 in one embodiment.

As illustrated in FIGS. 1 to 3, the refrigerator for a vehicle 1 according to the present disclosure is detachably installed at a seat 300 of a vehicle. The refrigerator for a vehicle 1 comprises a seat mounting part 100 directly mounted on the seat 300, and a refrigeration module attached to and detached from the seat mounting part 100. Additionally, the seat mounting part 100 is fixed to the seat 300 by a fixation belt part 200 described hereinafter.

The refrigeration module 10 forms a single module in such a way that a storage part 20, a cup holder part 30, and a machine compartment 40 are connected. A cooling system performing heat exchange with refrigerants, and a battery used as a subsidiary power source may be installed inside the refrigeration module 10.

The storage part 20 is provided with an inner space 22 for storing a beverage container and the like, and the cup holder part 30 is provided with a groove part for holding a beverage container, and is provided with refrigerants and cools the beverage container.

According to the present disclosure, the machine compartment 40 supplies refrigerants to a first heat exchanger 24 of the storage part 20, and a second heat exchanger 33 of the cup holder part 30, ensuring cooling efficiency that improves further than a refrigerator using the Peltier effect. Additionally, the machine compartment 40 and the storage part 20 share the machine compartment 40, reducing production costs.

Refrigerants transferred to the outside of the machine compartment 40 may be transferred respectively to the storage part 20 and the cup holder part 30, or may be supplied to any one of the storage part 20 and the cup holder part 30, based on the operation of a control valve 44.

Since a beverage container mounted in the cup holder part 30 is cooled by refrigerants, the beverage container mounted in the cup holder part 30 may be drawn without opening the storage part 20, and the leakage of cold air of the storage part 20 may be prevented.

Additionally, in a state in which the seat mounting part 100 is fixed to the upper side of the seat 300, the refrigeration module 10 is docked at the upper side of the seat mounting part 100, ensuring case of attachment and detachment of the refrigeration module 10. The seat mounting part 100 and the storage part 20 serving as a refrigerator are attachable and detachable, and the storage part 20 is separable from the seat mounting part 100 and used as a refrigerator for camping. To this end, the refrigeration module 10 may be provided with a connection terminal for supply a power source.

Air discharged from the refrigeration module 10 may move downward, at a slant, toward the front of the seat 300, through the seat mounting part 100. Alternatively, air discharged from the refrigeration module 10 may be discharged toward the rear of the seat 300 through the seat mounting part 100.

[Refrigeration Module]

FIG. 4 is a perspective view showing a main configuration of the refrigeration module 10 in one embodiment, and FIG. 5 is a block diagram showing a main configuration of the refrigeration module 10 in one embodiment.

As illustrated in FIGS. 4 and 5, the refrigeration module 10 comprises a storage part 20 that has an inner space 22 provided with a first heat exchanger 24 and configured to store items, a cup holder part 30 that is provided with a mounting groove part 32 in which a beverage container is mounted, and a second heat exchanger 33, and a machine compartment 40 that supplies refrigerants to the first heat exchanger 24 and the second heat exchanger 33. Further, the refrigeration module may further comprise a hold protrusion 50 and a discharge hole part 60.

The exterior of the refrigeration module 10 is shaped into an approximately rectangular cuboid, and is held by the upper side of the seat mounting part 100 such that the movement of the refrigeration module 10 is restricted.

[Storage Part]

The storage part 20 is provided with a first heat exchanger 24 that is supplied with refrigerants and exchanges heat with a surrounding object, and is modifiable in various different forms within a technical spirit where the storage part 20 has an inner space 22 storing an item therein.

The storage part 20 functioning as a refrigerator is provided with a space that separates from the inside of the cup holder part 30 and the inside of the machine compartment 40. Additionally, the first heat exchanger 24 that is connected to the machine compartment 40, is supplied with refrigerants and exchanges heat is installed in a position facing the inner surface of the inner space 22 of the storage part 20.

The storage part 20 in one embodiment comprises a storage body 21 and a storage door 23. The storage body 21 has an inner space 22 for refrigerating and storing an item at a low temperature, and the upper side of the storage body is open. The storage body 21 is shaped into an approximately rectangular cuboid, and has the inner space 22 therein.

The storage door 23 is rotatably installed at the upper side of the storage body 21, and opens and closes the inner space 22, based on its rotation motion.

Additionally, the first heat exchanger 24 is installed inside the storage body 21 facing the inner space 22. Since the first heat exchanger 24 is installed inside the storage body 21, the inner surface of the storage body 21, facing the inner space 22, cools based on the cooling operation of the first heat exchanger 24. Alternatively, since the first heat exchanger 24 and a portion of the inner space 22 communicate with each other, air in the inner space 22 may cool while passing through the first heat exchanger 24.

The first heat exchanger 24 may be provided with a plurality of heat sinks and installed in a rectangular cuboid shape.

[Cup Holder Part]

The cup holder part 30 has a space separate from the inside of the storage part 20, and has a mounting groove part 32 in which a beverage container is mounted. Additionally, the cup holder part 30 is provided with a second heat exchanger 33 cooling a beverage container mounted in the mounting groove part 32.

The cup holder part 30 in one embodiment is disposed at the front of the storage part 20, and the machine compartment 40 is disposed at the lower side of the cup holder part 30. The cup holder part 30 in one embodiment comprises a cup holder housing 31 and a second heat exchanger 33.

The cup holder housing 31 and the storage part 20 are installed one after another, and the cup holder housing 31 is modifiable in various different forms within the technical spirit where the mounting groove part 32 the upper side of which is open is installed inside the cup holder housing 31. The cup holder housing 31 in one embodiment is disposed at the front of the storage part 20, in such a way that the cup holder housing 31 and the storage part 20 are installed one after another, and has a plurality of mounting groove parts 32, the upper side of which is open, is installed in the cup holder housing 31.

The second heat exchanger 33 is installed in such a way that the second heat exchanger 33 is wound along the outer circumference of the mounting groove part 32. For the second heat exchanger 33, a pipe guiding the movement of refrigerants is installed in the form of a spiral-shaped tube. The second heat exchanger 33 is installed at the inner side of the cup holder housing 31, facing the mounting groove part 32.

Since refrigerants move through the second heat exchanger 33, the inner side of the mounting groove part 32 is cooled by the second heat exchanger 33, and a beverage container mounted in the mounting groove part 32 is also cooled. Accordingly, the beverage container mounted in the cup holder part 30 is drawn without opening the storage part 20, such that the leakage of cold air of the storage part 20 is blocked, ensuring improvement in the cooking efficiency of the storage part 20.

The heat exchanger that is supplied with refrigerants through the machine room 40 is installed respectively at the cup holder part 30 and the storage part 20 that serves as a refrigerator, such that the cup holder part 30 and the storage part 20 are respectively cooled by the refrigerants coming from the machine compartment 40.

In the summer, the cup holder part 30 and the storage part 20 may operate at the same time, and in the winter, any one of the cup holder part 30 and the storage part 20 may operate selectively, ensuring improvement in user satisfaction with a product.

Two mounting groove parts 32 are provided in front of the upper end of the storage part 20, and perform a cooling function, based on the operation of the second heat exchanger 33. The second heat exchanger 33 is a pipe-shaped evaporator and installed in such a way that the second heat exchanger 33 is wound around the outside of the mounting groove part 32.

[Machine Compartment]

The machine compartment 40 is installed in a space separate from the storage part 20, and is modifiable in various different forms within the technical spirit where the machine compartment supplies refrigerants to the first heat exchanger 24 and the second heat exchanger 33. The machine compartment 40 in one embodiment comprises a compressor 41, a condenser 42, an air blowing part 43 and a control valve 44.

The compressor 41 is connected to the first heat exchanger 24 and the second heat exchanger 33, and compresses refrigerants supplied from the first heat exchanger 24 and the second heat exchanger 33 and delivers the compressed refrigerants to the condenser 42.

The condenser 42 receives the refrigerants through the compressor 41, and cools the refrigerants by exchanging heat with air. The refrigerants cooled in the condenser 42 is delivered to the first heat exchanger 24 and the second heat exchanger 33 through an expansion valve.

The air blowing part 43 is installed inside the machine compartment 40, and rotates based on the operation of a motor and forms a flow of air passing through the condenser 42.

The control valve 44 is connected to the condenser 42, the first heat exchanger 24 and the second heat exchanger 33, and controls the supply of the refrigerants having passed through the condenser 42 to the first heat exchanger 24 and the second heat exchanger 33. A flow path in which the refrigerants having passed through the condenser 42 moves is determined by the control valve 44.

The control valve 44 may use a three-way valve, and refrigerants having passed through the control valve 44 moves to the first heat exchanger 24 or the second heat exchanger 33 and cools a target space or a target object and then moves to the compressor 41.

The second heat exchanger 33 cools a beverage container inside the mounting groove part 32, and the first heat exchanger 24 cools the inner side of the storage part 20 that is a console box-shaped refrigerator.

As described above, a three-way valve is used for a control valve 44 installed in the machine compartment 40, and when necessary, the control valve 44 may distribute refrigerants.

Further, the machine compartment 40 according to the present disclosure is designed in a compact manner to maximize the inner capacity of the storage part 20 functioning as a refrigerator, in a limited space in a vehicle. Accordingly, the machine compartment 40 is disposed at the lower side of the cup holder part 30.

[Hold Protrusion]

FIG. 6 is a perspective view showing that the refrigeration module 10 in one embodiment is separated from a seat mounting part 100, and FIG. 7 is a cross-sectional view showing that the refrigeration module 10 in one embodiment is separated from a seat mounting part 100.

As illustrated in FIGS. 6 and 7, the hold protrusion 50 is modifiable in various different forms within the technical spirit where the hold protrusion 50 protrudes downward toward the docking part 111 and is held by the docking part 111. The hold protrusion 50 protrudes to the lower side of the refrigeration module 10, and the hook-shaped protrusion is inserted into and fixed to the docking part 111 provided at the seat mounting part 100. The hold protrusion 50 in one embodiment comprises a first hold protrusion and a second hold protrusion 52.

The first hold protrusion 51 has a protrusion shape that protrudes toward the lower side of the refrigeration module 10 and is held by the docking part 111. The first hold protrusion 51 has a protrusion shape that extends in the widthwise direction W of the refrigeration module 10, and is fixed to the docking part 111 in such a way that the first hold protrusion 51 is inserted and held into a groove part provided at the docking part 111.

The second hold protrusion 52 is disposed behind the first hold protrusion 51, and has a protrusion shape that protrudes toward the lower side of the refrigeration module 10 and is held by the docking part 111.

[Discharge Hole Part]

FIG. 10 is a cross-sectional view showing that air discharged to the lower side of the refrigeration module 10 in one embodiment is discharged forward and downward, at a slant, along a seat mounting part 100, and FIG. 11 is a cross-sectional view showing that air discharged to the lower side of the refrigeration module 10 in one embodiment is discharged toward the rear of a seat, along a seat mounting part 100.

As illustrated in FIGS. 10 and 11, the discharge hole part 60 is connected to the machine compartment 40, and is modifiable in various different forms within the technical spirit where the discharge hole part 60 becomes a passage of air discharged from the machine compartment 40. The discharge hole part 60 as a hole for discharging air is disposed at the lower side of the machine compartment 40.

Air, the temperature of which increases while the air cools the condenser 42 in the machine compartment 40, is discharged out of the refrigeration module 10 through the discharge hole part 60. The discharge hole part 60 in one embodiment comprises a first discharge hole part 61 forming a passage for discharging air toward the front of the seat 300, and a second discharge hole part 62 forming a passage for discharging air toward the rear of the seat 300.

The first discharge hole part 61 forms a passage for discharging air, near the lower side or an edge of the machine compartment 40, toward the front of the machine compartment 40.

Additionally, the second discharge hole part 62 forms a passage for discharging air at the lower side of the machine compartment 40 facing the seat mounting part 100.

[Scat Mounting Part]

FIG. 8 is a perspective view showing a seat mounting part 100 and a fixation belt part 200 in one embodiment, FIG. 9 is a cross-sectional view showing that the refrigerator for a vehicle 1 in one embodiment is mounted on a seat 300, and FIG. 12 is a partially cut perspective view showing that air discharged to the lower side of the refrigeration module 10 in one embodiment is discharged toward the rear of a seat 300, along a seat mounting part 100.

As illustrated in FIGS. 8, 9 and 12, the seat mounting part 100 is mounted on the seat for a vehicle 300, and is modifiable in various different forms within the technical spirit where the docking part 111 connected to the refrigeration module 10 is provided on the upper surface of the seat mounting part 100. The seat mounting part 100 in one embodiment comprises a mounting housing 110, an extension body 120, a rotation fixation part 130, a first discharge guide part 140 and a second discharge guide part 150.

According to the present disclosure, since the refrigeration module 10 is detachably installed at the seat mounting part 100, the refrigeration module 10 may be separated from the seat mounting part 100 and used for camping or at home, ensuring improvement in user satisfaction.

The seat mounting part 100 may be fixed to the seat for a vehicle 300, and based on the refrigeration module 10's operation of docking at the seat mounting part 100, may supply a power source to the refrigeration module 10. To this end, a connector for supplying a power source may be additionally installed at the refrigeration module 10 and the seat mounting part 100.

Electricity for a vehicle may move to the connector for supplying a power source through a power source connection terminal provided at the seat mounting part 100, and then may move to the refrigeration module 10 and be supplied to the refrigeration module 10. Alternatively, various embodiments including a direct supply of electricity for a vehicle to the refrigeration module 10, and the like may be created in different forms.

Additionally, an air flow path may be formed outside the seat mounting part 100 or provided along the inside of the seat mounting part 100, such that air discharged from the machine compartment 40 is prevented from being delivered to the user directly.

Further, various embodiments including eccentric installation of the seat mounting part 100 in one direction of the seat for a vehicle 300 rather than installation of the seat mounting part 100 at the center of the seat 300, and the like may be created in different forms.

When necessary, the refrigeration module 10 and the seat mounting part 100 may be embodied as an integrated module, and the integrated module may be fixed to the seat 300 through the fixation belt part 200 and the rotation fixation part 130.

A Bluetooth speaker may be installed at the refrigeration module 10 or the seat mounting part 100, and an air filter for removing foreign substances of air may be additionally installed inside the seat mounting part 100 provided with an air flow path.

Additionally, a wireless communication module part may be additionally installed in the refrigerator for a vehicle 1 according to the present disclosure, and based on a wireless communication with a vehicle, may control electronic products of the vehicle, or may control the operation of the refrigeration module 10 in the driving seat.

The front of the seat mounting part 100 may be fixed to the seat for a vehicle 300, based on a screw rotation, and the rear of the seat mounting part 100 may be fixed based on fastening of the fixation belt part 200 connected to the lower portion of the seat for a vehicle 300.

[Mounting Housing]

The mounting housing 110 is disposed at the upper side of the seat 300, and extend in the front-rear direction of the seat 300. The mounting housing 110 in one embodiment comprises a docking part 111, a belt mounting part 115 and a separation button 116.

In terms of the seat for a vehicle 300, since the rear of the seat 300 supporting the user's hips is disposed lower than the front of the seat 300 supporting the user's thighs, the lower surface of the mounting housing 110 is installed in such a way that the lower surface of the mounting housing 110 inclines downward toward the rear of the seat 300. Accordingly, the thickness of the mounting housing 110 increases gradually from the front thereof to the rear thereof.

The lower surface of the mounting housing 110 extends downward, at a slant, and the upper surface of the mounting housing 110 forms a planar surface. Accordingly, the refrigeration module 10 docked to the upper surface of the mounting housing 110 may be reliably supported.

The docking part 111 is installed on the upper surface of the mounting housing 110. The docking part 111 in one embodiment comprises a first docking part 112 and a second docking part 113.

The first docking part 112 forms a groove part that extends in the widthwise direction W of the mounting housing 110. Accordingly, the first hold protrusion 51 is inserted and held into the first docking part 112, to limit the movement of the refrigeration module 10.

The second docking part 113 is disposed at the rear of the first docking part 112, and forms a groove part that extends in the widthwise direction W of the mounting housing 110. Further, the second docking part 113 may be unlocked based on the operation of the separation button 116 provided on a lateral surface of the mounting housing 110.

One lateral surface of the second docking part 113 is pressed by a spring, and at a time when the second hold protrusion 52 moves to the inside of the second docking part 113, one lateral surface of the second docking part 113 moves while being pushed by the second hold protrusion 52, and then moves to an initial position, based on a press of the spring, to limit the moment of the second hold protrusion 52. Additionally, based on a pressing motion of the separation button 116, one lateral surface of the second docking part 113 is moved to unlock the second hold protrusion 52.

The belt mounting part 115 is installed on the rear surface of the mounting housing 110. The belt mounting part 115 is provided with a groove part into which a belt hold part 210 of the fixation belt part 200 is inserted and held. The belt mounting part 115 has a structure which is the same as or similar to a structure for fixing a seat belt for a vehicle.

The extension body 120 is installed in such a way that the extension body 120 extends downward from one side in the front-rear direction of the mounting housing 110 and then bends toward the rear of the seat 300. The extension body 120 in one embodiment is installed in such a way that the extension body 120 extends downward from the front of the seat 300 and then bends toward the rear of the seat 300. The extension body 120 is installed in a "⌊" shape, and the rotation fixation part 130 is installed at the extension body 120 disposed at the lower side of the seat 300.

[Rotation Fixation Part]

The rotation fixation part 130 is rotatably installed at the extension body 120, and is modifiable in various different forms within the technical spirit where the rotation fixation part 130 moves up and down based on a rotation motion, and is fixed to the seat 300. The rotation fixation part 130 in one embodiment comprises a fixation plate 131, a rotation body 132 and a handle part 133.

The fixation plate 131 is disposed between the seat 300 and the extension body 120, and the movement of the fixation plate 131 is limited while contacting the lower side of the seat 300. The fixation plate 131 is shaped into a plate, and is moved up and down based on the rotation of the rotation body 132.

The rotation body 132 is connected to the fixation plate 131, rotated together with the fixation plate 131, and installed in such a way that the rotation body 132 penetrates the extension body 120. A screw thread having a spiral shape is formed outside the rotation body 132, and a female thread is provided at the extension body 120. Thus, the rotation body 132 moves upward or downward while rotating.

The fixation plate 131 is fixed to the upper side of the rotation body 132, and the handle part 133 is connected to the lower side of the rotation body 132. The handle part 133 is connected to the lower side of the rotation body 132, and has a diameter greater than the rotation body 132. Accordingly, the fixation plate 131 may be moved upward and fixed to the lower side of the seat 300, based on the user's motion of holding and rotating the handle part 133.

[First Discharge Guide Part]

As illustrated in FIGS. 6, 7, and 10, the seat mounting part 100 may comprise a first discharge guide part 140 that guides the discharge of air toward the lower side of the front of the seat 300.

The first discharge guide part 140 forms a groove part having a concave shape, at the mounting housing 110 disposed at the lower side of the discharge hole part 60, and guides air discharged to the lower side of the discharge hole part 60 to the front of the mounting housing 110 downward, at a slant.

The first discharge guide part 140 forms a groove part having a concave shape, at one side of the mounting housing 110, and the bottom surface of the grove part is installed downward and forward, at a slant. Additionally, the first discharge hole part 61 is disposed at the upper side of the first discharge guide part 140.

Accordingly, air discharged downward through the first discharge hole part 61 moves the lower side of the front of the seat 300 along the first discharge guide part 140. As described above, the discharge of air discharged from the refrigeration module 10 is guided through the seat mounting part 100, such that the user is prevented from being exposed to air of a temperature greater than that of indoor air, thereby providing a pleasant environment.

The first discharge hole part 61 may also serve as a handle groove part of the refrigeration module 10. The heat of the machine compartment 40 may be discharged to the first discharge hole part 61 primarily, and may be guided along the first discharge guide part 104 as a flow path formed in front of the mounting housing 110 and guided to the lower side of a front seat 300.

[Second Discharge Guide Part]

As illustrated in FIGS. 11 and 12, the seat mounting part 100 may comprise a second discharge guide part 150 that forms a passage penetrating the insides of the mounting housing 110 and the extension body 120 and guides air discharged from the discharge hole part 60 to the rear of the seat 300.

The second discharge guide part 150 forms an air flow path inside the mounting housing 110 and the extension body 120, to discharge heat coming from the machine compartment 40 toward the rear side of the seat 300. The second discharge guide part 150 in one embodiment comprises a first passage part 151 and a second passage part 152.

The first passage part 151 forms a passage through which air moves, inside the mounting housing 110, and the upper side of the first passage part 151 communicates with the discharge hole part 60. The first passage part 151 extends in the up-down direction, and communicates with the second discharge hole part 62. In the case where the second discharge hole part 62 is provided in a plurality of numbers, the first passage part 151 installed in a position facing the second discharge hole part 62 is also provided in a plurality of numbers.

The second passage part 152 forms a passage through which air moves, inside the extension body 120, and an inlet part provided at the upper side of the second passage part 152 connects to the first passage part 151, while an outlet part provided at the lower side of the second passage part 152 connects to a lateral surface of the extension body 120.

Accordingly, air, the temperature of which increases while the air cools the machine compartment 40 where a cooling systems is installed, is moved to the second discharge guide part 150 along the second discharge hole part 62 provided at the lower side of the machine compartment 40, and then discharged toward the rear side of the seat 300.

Heated air drawn through the first passage part 151 is moved to the lower side of the seat 300 through the second passage part 152, and then discharged toward the rear side of the seat 300, to prevent the heated air from contacting the user directly.

[Fixation Belt Part]

The fixation belt part 200 is modifiable in various different forms within the technical spirit where one side of the fixation belt part 200 connects to the seat mounting part 100 while the other side connects to a structure of the seat 300 such that the fixation belt part 200 limits the movement of the seat mounting part 100. The fixation belt part 200 in one embodiment comprises a belt hold part 210, a belt member 220 and a hold ring part 230.

The belt hold part 210 is modifiable in various different forms within the technical spirit where the belt hold part 210 is inserted and held into the belt mounting part 115 provided at the seat mounting part 100. The belt hold part 210 in one embodiment has a shape similar to or the same as that of a buckle provided at a seat belt for a vehicle.

The belt member 220 is connected to the belt hold part 210, and its length is adjustable. The belt member 220 may extend in a strap or string shape, and one side of the belt member 220 connects to the belt hold part 210, while the other side connects to the hold ring part 230.

The hold ring part 230 is modifiable in various different forms within the technical spirit where the hold ring part 230 is connected to the belt member 230 and held by a cross shaft bar 310 provided at the seat 300 such that the movement of the hold ring part 230 is limited. The hold ring part 230 in one embodiment bends in a "U" shape, and is held by the cross shaft bar 310 such that the movement of the hold ring part 230 is limited.

In the state where the hold ring part 230 is held and fixed to the cross shaft bar 310 of the seat 300, the belt hold part 210 is inserted and held into the belt mounting part 115 of the seat mounting part 100. Additionally, the rotation fixation part 130 is fixed to the lower side of the seat 300 such that the movement of the seat mounting part 100 is limited.

The hold ring part 230 may connect to an Isofix fixation ring provided at the seat 300. In addition, the hold ring part 230 may be fixed to various positions of the seat 300, where the hold ring part 230 can be held.

Hereafter, the installation and operation state of the refrigerator for a vehicle 1 in one embodiment are specifically described with reference to the accompanying drawings.

The rotation fixation part 130 provided at the seat mounting part 100 is rotated such that the fixation plate 131 contacts the lower side of the seat 300. Accordingly, a forward movement of the seat mounting part 100 is limited by the rotation fixation part 130.

Further, the hold ring part 230 is held by the cross shaft bar 310 of the seat 300, and the belt hold part 210 is inserted into and fixed to the belt mounting part 115, such that a rearward movement of the seat mounting part 100 is limited.

In the state where the seat mounting part 100 is fixed to the upper side of the seat 300, the first hold protrusion 51 of the refrigeration module 10 is inserted into the first docking part 112, and the second hold protrusion 52 is inserted into the second docking part 113, such that the refrigeration module 10 is mounted on the upper side of the seat mounting part 100.

The supply of refrigerants supplied to the first heat exchanger 24 and the second heat exchanger 33 through the machine compartment 40 is controlled based on the operation of the control valve 44. Accordingly, in various operation states, the storage part 20 as well as the cup holder part 30 may cool, and when necessary, any one of the cup holder part 30 and the storage part 20 may operate.

In the case of a refrigerator for a vehicle 1 in one embodiment, the refrigeration module separates from the seat mounting part 100 and moves separately, and the refrigerator for a vehicle 1 may be installed and separated easily and quickly.

[In-Vehicle Refrigerator]

Hereinafter, a refrigerator for a vehicle 400 in another embodiment is described with reference to the drawings.

For convenience of description, components that are configured and operate in the same way as the components in one embodiment are configured and operate, and the components in one embodiment are given identical reference numerals or names, and their detailed description is omitted.

FIG. 13 is a perspective view showing a refrigerator for a vehicle 400 in another embodiment, FIG. 14 is an exploded perspective view showing the refrigerator for a vehicle 400 in another embodiment, FIG. 24 is a perspective view showing that the refrigerator for a vehicle 400 in another embodiment is mounted on a seat, and FIG. 25 is a perspective view showing a discharge hole part 460 and a first discharge guide part 540 in another embodiment.

As illustrated in FIGS. 13, 14, 24 and 25, the refrigerator for a vehicle 400 in another embodiment is detachably installed at a seat of a vehicle. The refrigerator for a vehicle 400 comprises a seat mounting part 500 mounted directly on a seat and a refrigeration module 410 attached to and detached from the seat mounting part 500.

The refrigeration module 410 connects to the storage part 420 and the machine compartment 440 and forms a single module. A cooling system that exchanges heat by using refrigerants, and a battery that is used as a subsidiary battery may be installed inside the refrigeration module 410. The storage part 420 has an inner space for storing beverage containers and the like.

In the present disclosure, the machine compartment 440 supplies refrigerants to the first heat exchanger of the storage part 420, thereby ensuring improvement in cooling efficiency, compare to a refrigerator using the Peltier effect.

Additionally, since the refrigeration module 410 is docked at the upper side of the seat mounting part 500, in the state where the seat mounting part 500 is fixed to the upper side of the seat, the refrigeration module 410 may be attached and detached readily. The seat mounting part 500, and the storage part 420 functioning as a refrigerator are attachable and detachable, and the storage part 420 is separable from the seat mounting part 500 and is used as a refrigerator for camping. To this end, the refrigeration module 410 may be provided with a connection terminal for a power supply.

Air discharged from the refrigeration module 410 may move to the front of the seat downward, at a slant, through the seat mounting part 500.

[Refrigeration Module]

The refrigeration module 410 comprises a storage part 420 that is provided with a first heat exchanger and has an inner space where an item is stored, and a machine compartment 440 that supplies refrigerants to the first heat exchanger. The refrigeration module 410 may further comprise a hold protrusion 450 and a discharge hole part 460.

The exterior of the refrigeration module 410 is shaped into an approximately rectangular cuboid, and the refrigeration module 420 is held by the upper side of the seat mounting part 500 such that the moment of the refrigeration module 410 is limited.

[Storage Part]

The storage part 420 is provided with a first heat exchanger that is supplied with refrigerants and exchanges heat with a surrounding object, and is modifiable in various different forms within the technical spirit where the storage part 420 has an inner space in which an item is stored, therein.

The storage part 420 functioning as a refrigerator has a space that separates from the inside of the machine compartment 440. Additionally, the first heat exchanger that is connected to the machine compartment 440, is supplied with refrigerants and exchanges heat is installed in a position facing the inner surface of the inner space of the storage part 420.

The storage part 420 in one embodiment comprises a storage body 421 and a storage door 423. The storage body 421 has an inner space for refrigerating and storing an item at a low temperature, and the upper side of the storage body 421 is open. The storage body 421 is shaped into an approximately rectangular cuboid, and has an inner space therein.

The storage door 423 is installed at the upper side of the storage body 421, and opens and closes the inner space of the storage body 421.

The first heat exchanger is installed inside the storage body 42, which faces the inner space. Since the first heat exchanger is installed inside the storage body 421, the inner surface of the storage body 421, facing the inner space, is cooled based on the cooling operation of the first heat exchanger. Alternatively, since a portion of the inner space communicates with the first heat exchanger, air of the inner space may be cooled while passing through the first heat exchanger.

The first heat exchanger may be provided with a plurality of heat sinks and installed in a rectangular cuboid shape.

[Machine Compartment]

The machine compartment 440 is installed in a space separate from the storage part 420, and is modifiable in various different forms within the technical spirit where the machine compartment 440 supplies refrigerants to the first heat exchanger. The machine compartment 440 in another embodiment comprises a compressor 41, a condenser, an air blowing part 43, and a control valve 44.

The compressor 41 connects to the first heat exchanger, and compresses refrigerants supplied from the first heat exchanger and delivers the compressed refrigerants to the condenser.

The condenser receives the refrigerants through the compressor 41, and cools the refrigerants while exchanging heat with air. The refrigerants cooled in the condenser are delivered to the first heat exchanger through an expansion valve.

The air blowing part 43 is installed inside the machine compartment 440, and is rotated based on the operation of a motor and forms a flow of air passing through the condenser.

The control valve 44 connects to the condenser and the first heat exchanger, and controls a supply of refrigerants having passed through the condenser to the first heat exchanger. The flow path in which the refrigerants having passed through the condenser moves is determined by the control valve 44.

Further, the machine compartment 440 according to the present disclosure is compactly designed to maximize the inner capacity of the storage part 420 functioning as a refrigerator, in a limited inner space of a vehicle, and disposed at the lower side of the cup holder part 30.

[Hold Protrusion]

FIG. 15 is a cross-sectional view showing that a refrigeration module 410 is connected to a seat mounting part 500 in another embodiment, FIG. 16 is a bottom view showing a refrigeration module 410 in another embodiment, and FIG. 17 is a plan view showing a seat mounting part 500 in another embodiment.

As illustrated in FIGS. 15 to 17, the hold protrusion 450 is modifiable in various different forms within the technical spirit where the hold protrusion 450 protrudes downward toward a docking part 511 and is held by the docking part 511. The hold protrusion 450 protrudes to the lower side of the refrigeration module 410, and the hook-shaped protrusion is inserted into and fixed to the docking part 511 provided at the seat mounting part 500. The hold protrusion 450 in one embodiment comprises a first hold protrusion 451 and a second hold protrusion 452.

The first hold protrusion 451 is shaped into a protrusion that protrudes to the lower side of the refrigeration module 410 and is held by the docking part 511. The first hold protrusion 451 is shaped into a protrusion that extends in the widthwise direction W of the refrigeration module 410, and fixed in such a way that the first hold protrusion is inserted and held into a groove part provided at the docking part 511.

The second hold protrusion 452 is shaped into a protrusion that is disposed at the rear of the first hold protrusion 451, and protrudes to the lower side of the refrigeration module 410 and is held b the docking part 511. The second hold protrusion 452 is provided with a rod shape that extends in the horizontal direction.

[Discharge Hole Part]

As illustrated in FIG. 25, the discharge hole part 460 connects to the machine compartment 440, and is modifiable in various different forms within the technical spirit where the discharge hole part 460 is a passage of air discharged from the machine compartment 440. The discharge hole part 460 as a hole for discharging air is disposed at the lower side of the machine compartment 440.

Air, the temperature of which increase while the air cools the condenser in the machine compartment 440, is discharged out of the refrigeration module 410 through the discharge hole part 460. The discharge hole part 460 in one embodiment comprises a first discharge hole part 461 that forms a passage for discharging air to the front of the seat.

The first discharge hole part 461 forms a passage for discharging air near the lower side or an edge toward the front of the machine compartment 440.

[Seat Mounting Part]

The seat mounting part 500 is mounted on a seat for a vehicle, and is modifiable in various different forms within the technical spirit where the docking part 511 connecting to the refrigeration module 410 is provided on the upper surface of the seat mounting part 500. The seat mounting part 500 in one embodiment comprises a mounting housing 510, an extension body 520, a first discharge guide part 540, a moving plate 560, a protruding projection 570, a multi-stepped connection part 580, and a rear surface fixation part 700.

[Mounting Housing]

The mounting housing 510 is disposed at the upper side of a seat, and extends in the front-rear direction of the seat. The mounting housing 510 in one embodiment comprises a docking part 511 and a rear surface fixation part 700.

The lower surface of the mounting housing 510 extends downward, at a slant, and the upper surface of the mounting housing 510 forms a planar surface. Accordingly, the refrigeration module 410 docked on the upper surface of the mounting housing 510 may be reliably supported.

The docking part 511 is installed on the upper surface of the mounting housing 510. The docking part 511 in one embodiment comprises a first docking part 512 and a second docking part 513.

The first docking part 512 forms a groove part that extends in the widthwise direction W of the mounting housing 510. Accordingly, the first hold protrusion 451 is inserted and held into the first docking part 512, such that the movement of the refrigeration module 410 is limited.

The second docking part 513 is disposed at the rear of the first docking part 512, and based on a rotation motion, is held and coupled to or decoupled from the hold protrusion 450 provided at the refrigeration module 410.

FIG. 18 is a perspective view showing a second docking part 513 in another embodiment, FIG. 19 is a perspective view showing that a tension spring 1540 is installed at the second docking part 513 in another embodiment, FIG. 20 is a front view showing that the second docking part 513 in another embodiment is installed in the state of being open, and FIG. 21 is a front view showing that the second docking part 513 in another embodiment is installed in the state of being locked.

As illustrated in FIGS. 18 to 21, the second docking part 513 in another embodiment comprises a docking housing 1514 that is fixed to the mounting housing 510, a locking plate 1515 that is rotatably installed at the docking housing 1514 and provided with a locking groove 1516 into which the hold protrusion 450 is inserted and held, a moving bar 1517 that moves in a linear direction and controls the rotation motion of the locking plate 1515, and an operating bar 1520 that is coupled to the moving bar 1517 and moves the moving bar 1517 based on a rotation motion.

The docking housing 1514 is fixed to the upper surface of the mounting housing 510 and installed in such a way that the docking housing 1514 protrudes upward. The locking plate 1515 is rotatably installed inside the docking housing 1514 shaped into a pair of plates.

The second hold protrusion 452 is inserted and held into the locking groove 1516 provided at the locking plate 1515 such that the second hold protrusion 452 is fixed to the second docking part 513.

The moving bar 1517 is installed in such a way that the moving bar 1517 penetrates the inside of the docking housing 1514, and the rotation of the locking plate 1515 is controllable based on a linear movement of the moving bar 1517.

The operating bar 1520 and the moving bar 1517 are installed in such a way that the operating bar 1520 and the moving bar 1517 cross each other, and a side projection 1522 protruding outside the operating bar 1520 is inserted into an inner hole 1518 provided at the moving bar 1517 and connected to the moving bar 1517. Accordingly, the moving bar 1517 moves in the linear direction, based on the rotation of the operating bar 1520.

A tension spring 1540 is installed at a rotation axis of the locking plate 1515. Accordingly, the locking plate 1515 is elastically pressed such that the locking plate 1515 rotates in one side direction.

An operating spring 1530 is installed outside the moving bar 1517. The operating spring 1530 may be a coil spring and may be pressed based on the movement of the moving bar 1517. Accordingly, the moving bar 1517 moves based on the spring force of the operating spring 1530 and the rotation of the operating bar 1520.

For fixation of the refrigeration module 410 and the seat mounting part 500, a connection structure using a hook is used to fix the front surfaces of the refrigeration module 410 and the seat mounting part 500, and an Isofix is used to fix the rear surfaces of the refrigeration module 410 and the seat mounting part 500. A hook structure is applied to prevent the front side of the refrigerator for a vehicle 400 from being lifted at a time of forward collision of a vehicle. Further, an Isofix and latch structure is applied to prevent the rear side of the refrigerator for a vehicle 400 from being lifted and block an item from spring forward at a time of rear collision of a vehicle.

The rear surface fixation part 700 is installed on the rear surface of the mounting housing 510. The rear surface fixation part 700 is coupled to a fixation belt part 600 and limits the movement of the mounting housing 510.

The extension body 520 is installed in such a way that the extension body extends downward from one side of the mounting housing 510 in the front-rear direction thereof and then bends toward the rear of the seat. The extension body 520 in another embodiment is installed in such a way that the extension body 520 extends downward from the front of the seat and then bends toward the rear of the seat.

FIG. 22 is a plan view showing that a moving plate 560 is moved in a direction in which the moving plate 560 provided at the seat mounting part 500 in another embodiment becomes far from a mounting house 510, and FIG. 23 is a plan view showing that a moving plate 560 is moved further in a direction in which the moving plate 560 provided at the seat mounting part 500 in another embodiment becomes far from a mounting house 510.

As illustrated in FIGS. 22 and 23, the moving plate 560 is installed at the rear side of the mounting housing 510. The moving plate 560 moves together with the rear surface fixation part 700 since the moving plate 560 connects to the rear surface fixation part 700.

One side of the multi-stepped connection part 580 connects to the main body of the mounting housing 510 while the other side of the multi-stepped connection part 580 connects to the moving plate 560. The protruding projection 570 protruding from the multi-stepped connection part 580 extends upward while penetrating the moving plate 560.

The length of the multi-stepped connection part 580 varies based on a folding action or an unfolding action.

Since the size of a seat varies depending on the sort of a vehicle, the multi-stepped connection part 580 is installed to make the seat mounting part 500 variable, such that the refrigerator for a vehicle 400 is installed depending on the sort of a vehicle.

[First Discharge Guide Part]

As illustrated in FIG. 25, the seat mounting part 50 may comprise a first discharge guide part 540 that guides the discharge of air toward the lower side of the front of the seat.

The first discharge guide part 540 forms a groove part having a concave shape, at the mounting housing 510 disposed at the lower side of the discharge hole part 460, and guides air discharged to the lower side of the discharge hole part 460 downward toward the front of the mounting housing 510 at a slant.

The first discharge guide part 540 forms a groove part having a concave shape, at one side of the mounting housing 510, and the bottom surface of the groove part is installed to incline downward and forward, at a slant. Additionally, the first discharge hole part 461 is disposed at the upper side of the first discharge guide part 540.

Thus, air discharged downward through the first discharge hole part 461 moves to the lower side of the front of the seat along the first discharge guide part 540. As described above, the discharge of air discharged from the refrigeration module 410 is guided through the seat mounting part 500, to prevent the user from be exposed to air of a temperature greater than that of indoor air, thereby providing a pleasant usage environment.

[Fixation Belt Part]

The fixation belt part 600 is modifiable in various different forms within the technical spirit where one side of the fixation belt part 600 connects to the seat mounting part 500, and the other side connects to a structure of the seat, to limit the movement of the seat mounting part 500.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the range of the disclosure though not explicitly described in the description of the embodiment.

The invention claimed is:

1. A refrigerator for a vehicle, comprising:
   a refrigeration module having a refrigeration space therein;
   a seat mounting part sitting on a seat for a vehicle, and having a docking part connecting to the refrigeration module, on an upper surface thereof; and
   a fixation belt part one side of which connects to the seat mounting part and the other side of which connects to a structure of the seat, to limit a movement of the seat mounting part,
   wherein the docking part comprises a second docking part held and coupled to a hold protrusion provided at the refrigeration module or decoupled from the hold protrusion, based on a rotation motion, and
   wherein the second docking part comprises a locking plate provided with a locking groove into which the hold protrusion is inserted and held.

2. The refrigerator of claim 1, the refrigeration module, comprising:
   a storage part that is provided with a first heat exchanger supplied with refrigerants and configured to exchange heat with a surrounding object, and has an inner space for storing an item; and
   a machine compartment that is installed in a space separate from the storage part, and supplies refrigerants to the first heat exchanger.

3. The refrigerator of claim 2, the storage part, comprising:
   a storage body that has an inner space for refrigerating and storing an item at a low temperature, and has an open upper side; and
   a storage door that is installed at an upper side of the storage body and opens and closes the inner space.

4. The refrigerator of claim 3, wherein the first heat exchanger is installed inside the storage body facing the inner space.

5. The refrigerator of claim 2, the machine compartment, comprising:
   a compressor that connects to the first heat exchanger;
   a condenser that receives refrigerants through the compressor, and cools refrigerants while exchanging heat with air; and
   an air blowing part that forms a flow of air passing through the condenser.

6. The refrigerator of claim 5, the machine compartment, further comprising:
   a control valve that connects to the condenser and the first heat exchanger, and controls a supply of refrigerants having passed through the condenser to the first heat exchanger.

7. The refrigerator of claim 1, the seat mounting part, comprising:
   a mounting housing that is disposed at an upper side of the seat, extends in a front-rear direction of the seat, and includes the docking part; and an extension body that extends downward from one side of the mounting housing in a front-rear direction thereof, and then bends.

8. The refrigerator of claim 7, the docking part, comprising:
a first docking part that forms a groove part extending in a widthwise direction of the mounting housing; and
the second docking part that is disposed at a rear of the first docking part.

9. The refrigerator of claim 8, the second docking part, comprising:
a docking housing that is fixed to the mounting housing;
the locking plate that is rotatably installed at the docking housing;
a moving bar that moves linearly, and controls a rotation motion of the locking plate; and
an operating bar that is coupled to the moving bar, and moves the moving bar, based on a rotation motion.

10. The refrigerator of claim 9, wherein the operating bar and the moving bar are installed in such a way that the operating bar and the moving bar cross each other, and a side projection protruding outside the operating bar is inserted into an inner hole provided at the moving bar and is connected to the moving bar.

11. The refrigerator of claim 1, wherein the refrigeration module further comprises a hold protrusion that protrudes downward toward the docking part and is held by the docking part.

12. The refrigerator of claim 11, the hold protrusion, comprising:
a first hold protrusion that protrudes to a lower side of the refrigeration module and is held by the docking part; and
a second hold protrusion that is disposed at a rear of the first hold protrusion, and protrudes to the lower side of the refrigeration module and is held by the docking part.

13. The refrigerator of claim 8, wherein the fixation belt part is fastened to a rear surface fixation part installed at a rear of the seat mounting part.

14. A refrigerator for a vehicle, comprising:
a refrigeration module provided with a storage part that is provided with a first heat exchanger and has an inner space for storing an item, and a machine compartment that supplies refrigerants to the first heat exchanger;
a seat mounting part configured to sit on a seat for a vehicle, and provided with a docking part connecting to the refrigeration module; and
a fixation belt part one side of which connects to the seat mounting part and the other side of which connects to a structure of the seat, to limit a movement of the seat mounting part,
wherein a discharge direction of air discharged to a lower side of the refrigeration module is guided along the seat mounting part,
wherein the docking part comprises a second docking part held and coupled to a hold protrusion provided at the refrigeration module or decoupled from the hold protrusion, based on a rotation motion, and
wherein the second docking part comprises a locking plate provided with a locking groove into which the hold protrusion is inserted and held.

15. The refrigerator of claim 14, the refrigeration module, comprising:
a discharge hole part that connects to the machine compartment and is a passage of air discharged from the machine compartment.

16. The refrigerator of claim 15, the seat mounting part, comprising:
a mounting housing that is disposed at an upper side of the seat, extends in a front-rear direction of the seat, and comprises the docking part; and
an extension body that extends downward from one side of the mounting housing in a front-rear direction thereof, and then bends toward a rear of the seat.

17. The refrigerator of claim 16, the seat mounting part, further comprising:
a first discharge guide part that forms a groove part having a concave shape, at the mounting housing disposed at a lower side of the discharge hole part, and guides air discharged to the lower side of the discharge hole part downward, toward a front of the mounting housing, at a slant.

18. The refrigerator of claim 16, the docking part, comprising:
a first docking part that forms a groove part extending in a widthwise direction of the mounting housing; and
the second docking part that is disposed at a rear of the first docking part.

19. The refrigerator of claim 18, the second docking part, comprising:
a docking housing that is fixed to the mounting housing;
the locking plate that is rotatably installed at the docking housing;
a moving bar that moves linearly, and controls a rotation motion of the locking plate; and
an operating bar that is coupled to the moving bar, and moves the moving bar, based on a rotation motion.

20. The refrigerator of claim 19, wherein the operating bar and the moving bar are installed in such a way that the operating bar and the moving bar cross each other, and a side projection protruding outside the operating bar is inserted into an inner hole provided at the moving bar and is connected to the moving bar.

* * * * *